(12) United States Patent
Kobayashi

(10) Patent No.: US 12,549,407 B2
(45) Date of Patent: Feb. 10, 2026

(54) IN-VEHICLE APPARATUS AND INFORMATION PROCESSING METHOD HAVING A FIRST AND SECOND PROCESSING UNIT FOR CONTROLLING A VEHICLE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takuya Kobayashi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 202 days.

(21) Appl. No.: 18/262,954

(22) PCT Filed: Jan. 12, 2022

(86) PCT No.: PCT/JP2022/000707
§ 371 (c)(1),
(2) Date: Jul. 26, 2023

(87) PCT Pub. No.: WO2022/163349
PCT Pub. Date: Aug. 4, 2022

(65) Prior Publication Data
US 2024/0089145 A1 Mar. 14, 2024

(30) Foreign Application Priority Data
Jan. 27, 2021 (JP) .................................. 2021-011341

(51) Int. Cl.
*H04L 12/40* (2006.01)

(52) U.S. Cl.
CPC ............... *H04L 12/40006* (2013.01); *H04L 2012/40273* (2013.01)

(58) Field of Classification Search
None
See application file for complete search history.

(56) References Cited

U.S. PATENT DOCUMENTS 5,323,385 A * 6/1994 Jurewicz ................. H04L 9/40
370/476
2010/0114403 A1 * 5/2010 Isoyama ........... H04L 12/40006
701/1

(Continued)

FOREIGN PATENT DOCUMENTS

JP 2010-274783 A 12/2010
JP 2019-202605 A 11/2019

OTHER PUBLICATIONS

International Search Report, Application No. PCT/JP2022/000707, mailed Mar. 1, 2022. ISA/Japan Patent Office.

*Primary Examiner* — Jess Whittington
(74) *Attorney, Agent, or Firm* — Honigman LLP

(57) ABSTRACT

An in-vehicle apparatus includes a first processing unit for controlling the vehicle and is connected to a plurality of in-vehicle ECUs, a second processing unit, connected the plurality of in-vehicle ECUs, communicates with the first processing unit. A first reception table and a second reception table includes information indicating a type of a reception target message of the first processing unit second processing unit respectively. The second processing unit receives the reception target message of the second processing unit based on the second reception table and outputs information included in the received message to the first processing unit, and the first processing unit receives the reception target message of the first processing unit based on the first reception table and performs control processing (Continued)

based on at least one of information included in the received message and the information output from the second processing unit.

7 Claims, 13 Drawing Sheets

(56) References Cited

U.S. PATENT DOCUMENTS

| | | |
|---|---|---|
| 2014/0366035 A1 | 12/2014 | Yasuda |
| 2016/0377508 A1* | 12/2016 | Perrone ................. G01M 17/06 180/204 |
| 2019/0058613 A1 | 2/2019 | Maeda et al. |
| 2019/0182150 A1* | 6/2019 | Kim ...................... H04L 45/021 |
| 2021/0250200 A1* | 8/2021 | Kaneko .................. H04L 12/66 |
| 2023/0247038 A1* | 8/2023 | Haga ....................... H04W 4/44 726/23 |

* cited by examiner

Legend
A = Transmitter/recipient
B = Greater Than or Equal to Predetermined Amount
C = Smaller Than Predetermined Amount
D = First Processing Unit
E = Second Processing Unit
F = High priority level
G = Low priority level

| Security responsiveness | Priority level | With or without event | Transmission period | Data amount | A |
|---|---|---|---|---|---|
| Control message — High security responsiveness | High priority level | With event | Greater than or equal to predetermined period | B | D |
| | | | | C | D |
| | | | Shorter than predetermined period | B | D |
| | | | | C | D |
| | | Without event | Greater than or equal to predetermined period | B | E |
| | | | | C | E |
| | | | Shorter than predetermined period | B | D |
| | | | | C | D |
| | Low priority level | With event | Greater than or equal to predetermined period | B | D |
| | | | | C | D |
| | | | Shorter than predetermined period | B | E |
| | | | | C | E |
| | | Without event | Greater than or equal to predetermined period | B | D |
| | | | | C | D |
| | | | Shorter than predetermined period | B | D |
| | | | | C | D |
| Control message — Low security responsiveness | High priority level | With event | Greater than or equal to predetermined period | B | D |
| | | | | C | D |
| | | | Shorter than predetermined period | B | E |
| | | | | C | E |
| | | Without event | Greater than or equal to predetermined period | B | E |
| | | | | C | E |
| | | | Shorter than predetermined period | B | D |
| | | | | C | D |
| | Low priority level | With event | Greater than or equal to predetermined period | B | D |
| | | | | C | D |
| | | | Shorter than predetermined period | B | E |
| | | | | C | E |
| | | Without event | Greater than or equal to predetermined period | B | E |
| | | | | C | E |
| | | | Shorter than predetermined period | B | D |
| | | | | C | E |
| Diagnostic message | F | Without event | — | — | D |
| | G | Without event | — | — | E |

FIG. 3

| Broad classification | Narrow classification | Transmitter/recipient |
|---|---|---|
| Control message | | |
| Advanced driver assistance system-related (ADAS-related) | Inter-vehicle data | First processing unit |
| | Driving force data | First processing unit |
| | Meter notification data | Second processing unit |
| Airbag-related | Collision detection data | First processing unit |
| | Meter notification data | Second processing unit |
| Body control-related | Courtesy SW data | First processing unit |
| | Seating data | First processing unit |
| | Lamp illumination data | First processing unit |
| | Mirror-related data | Second processing unit |
| | Power slide data | Second processing unit |
| Navigation system-related | Drive recorder data | Second processing unit |
| | Meter notification data | Second processing unit |
| Travel-related | Accelerator state data | First processing unit |
| | Shift state data | First processing unit |
| | Brake state data | First processing unit |
| Vehicle information-related | Vehicle code data | Second processing unit |
| | Delivery data | Second processing unit |
| | Driving method data | Second processing unit |
| ⋮ | | |
| Diagnostic message | Data subject to regulation | First processing unit |
| | Data not subject to regulation | Second processing unit |
| | Freeze frame data | Second processing unit |

First table

| Message ID | Recipient |
|---|---|
| XXXXXXXXXXXXXXXX | First processing unit |
| XXXXXXXXXXXXXXXX | First processing unit |
| ⋮ | ⋮ |

FIG. 7

Abnormal-state table

| Message ID | Recipient |
|---|---|
| XXXXXXXXXXXXXXXX | First processing unit |
| XXXXXXXXXXXXXXXX | First processing unit |
| ⋮ | ⋮ |
| XXXXXXXXXXXXXXXX | Secondprocessing unit |
| XXXXXXXXXXXXXXXX | Secondprocessing unit |
| ⋮ | ⋮ |

FIG. 8

Transmission table

| Message ID | Transmission route |
|---|---|
| XXXXXXXXXXXXXXXX | First route |
| XXXXXXXXXXXXXXXX | First route |
| ⋮ | ⋮ |
| XXXXXXXXXXXXXXXX | Second processing unit and second route |
| XXXXXXXXXXXXXXXX | Second processing unit and second route |
| ⋮ | ⋮ |

FIG. 10

Second table

| Message ID | Recipient |
|---|---|
| XXXXXXXXXXXXXXXX | Second processing unit |
| XXXXXXXXXXXXXXXX | Second processing unit |
| ⋮ | ⋮ | ature of the present disclosure, it is possible to efficiently execute processing for controlling a vehicle.

IN-VEHICLE APPARATUS AND INFORMATION PROCESSING METHOD HAVING A FIRST AND SECOND PROCESSING UNIT FOR CONTROLLING A VEHICLE

CROSS-REFERENCE TO RELATED APPLICATIONS

This application is the U.S. national stage of PCT/JP2022/000707 filed on Jan. 12, 2022, which claims priority of Japanese Patent Application No. JP 2021-011341 filed on Jan. 27, 2021, the contents of which are incorporated herein.

TECHNICAL FIELD

The present disclosure relates to an in-vehicle apparatus and an information processing method.

BACKGROUND

A vehicle is equipped with a plurality of in-vehicle ECUs (Electronic Control Units) for controlling in-vehicle devices such as a power train system for engine control and the like and a body system for air conditioner control and the like. A plurality of in-vehicle ECUs are connected to an in-vehicle apparatus. The in-vehicle apparatus communicates with the in-vehicle ECUs and performs processing for controlling the vehicle including control of the in-vehicle devices (e.g., WO 2013/121545).

Since the processing for controlling the vehicle is concentrated in the in-vehicle apparatus of WO 2013/121545, it is desired that the in-vehicle apparatus performs the processing efficiently.

The present disclosure has been made in view of such circumstances, and an object of the present disclosure is to provide an in-vehicle apparatus and the like that can efficiently execute processing for controlling a vehicle.

SUMMARY

An in-vehicle apparatus according to one aspect of the present disclosure is an in-vehicle apparatus that is connected to a plurality of in-vehicle ECUs and is configured to transmit and receive messages to and from the plurality of in-vehicle ECUs, the in-vehicle apparatus including: a first processing unit that is configured to perform control processing for controlling a vehicle and is connected to each of the plurality of in-vehicle ECUs; a second processing unit that is connected to each of the plurality of in-vehicle ECUs and is configured to communicate with the first processing unit; a first reception table including information indicating a type of a reception target message of the first processing unit, which is a message, among the messages, that is to be received by the first processing unit; and a second reception table including information indicating a type of a reception target message of the second processing unit, which is a message, among the messages, that is to be received by the second processing unit, in which the second processing unit receives the reception target message of the second processing unit based on the second reception table, and outputs information included in the received message to the first processing unit, and the first processing unit receives the reception target message of the first processing unit based on the first reception table, and performs the control processing based on at least one of information included in the received message and information included in the message output from the second processing unit.

Advantageous Effects of the Disclosure

According to one aspect of the present disclosure, it is possible to efficiently execute processing for controlling a vehicle.

BRIEF DESCRIPTION OF DRAWINGS

FIG. 3 is an explanatory diagram illustrating an example of types of messages transmitted and received between an integrated ECU and individual ECUs.
FIG. 4 is an explanatory diagram illustrating an example of types of messages transmitted and received between an integrated ECU and individual ECUs.
FIG. 6 is a conceptual diagram showing an example of contents of a first table.
FIG. 7 is a conceptual diagram showing an example of contents of an abnormal-state table.
FIG. 8 is a conceptual diagram showing an example of contents of a transmission table.
FIG. 10 is a conceptual diagram showing an example of contents of a second table.

DETAILED DESCRIPTION OF PREFERRED EMBODIMENTS

Figure 1:
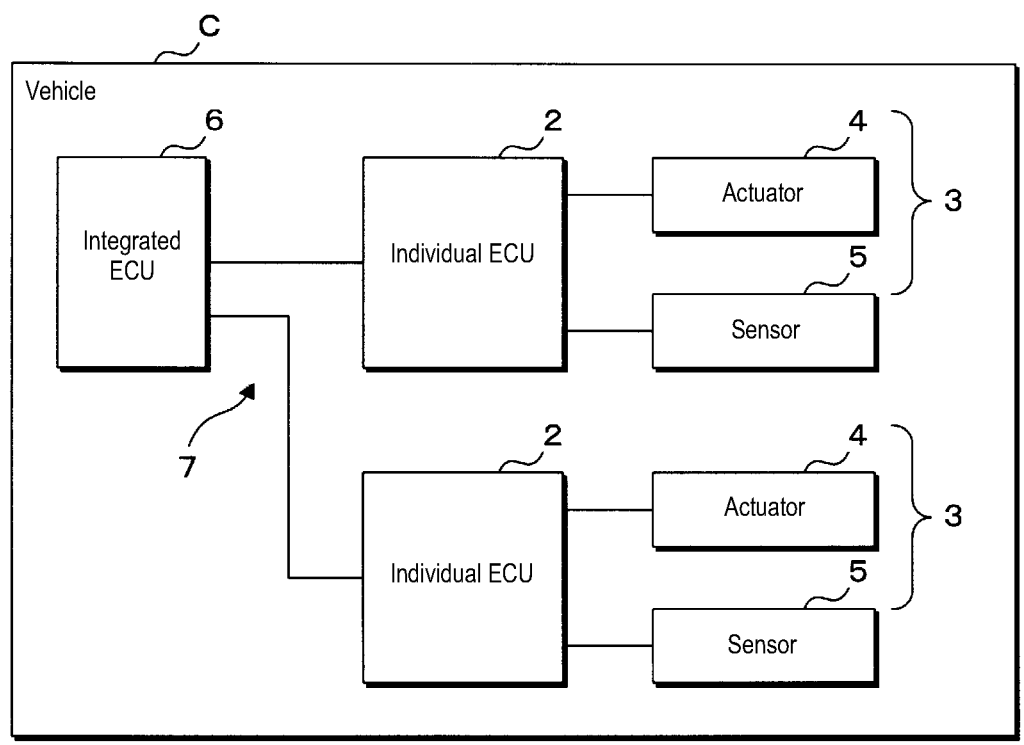
FIG. 1 is a schematic diagram illustrating a configuration of an in-vehicle system according to a first embodiment.

First, embodiments of the present disclosure will be listed and described. Also, at least some of the embodiments described below may be combined as appropriate.

An in-vehicle apparatus according to an aspect of the present disclosure is an in-vehicle apparatus that is connected to a plurality of in-vehicle ECUs and is configured to transmit and receive messages to and from the plurality of in-vehicle ECUs, the in-vehicle apparatus including: a first processing unit that is configured to perform control processing for controlling a vehicle and is connected to each of the plurality of in-vehicle ECUs; a second processing unit that is connected to each of the plurality of in-vehicle ECUs and is configured to communicate with the first processing unit; a first reception table including information indicating a type of a reception target message of the first processing unit, which is a message, among the messages, that is to be received by the first processing unit; and a second reception table including information indicating a type of a reception target message of the second processing unit, which is a message, among the messages, that is to be received by the second processing unit, in which the second processing unit receives the reception target message of the second processing unit based on the second reception table, and outputs information included in the received message to the first processing unit, and the first processing unit receives the reception target message of the first processing unit based on the first reception table, and performs the control processing based on at least one of information included in the received message and information included in the message output from the second processing unit.

In this aspect, the first processing unit and the second processing unit are communicably connected. The first processing unit and the second processing unit are each connected to an in-vehicle ECU. Based on the second reception table, the second processing unit receives a reception target message of the second processing unit out of the messages output from the in-vehicle ECU. The second processing unit acquires the information included in the received message. For example, the second processing unit retrieves the information included in the received message. The second processing unit outputs the acquired information to the first processing unit. The first processing unit acquires the information output from the second processing unit and performs control processing based on the acquired information. Also, based on the first reception table, the first processing unit receives a reception target message of the first processing unit among the messages output from the in-vehicle ECU. The first processing unit acquires information included in the received message and performs control processing based on the acquired information. The first processing unit also performs control processing based on the information included in the received message and the information acquired from the second processing unit. Messages output from the in-vehicle ECUs are distributed to and received by the first processing unit and the second processing unit. The load on the second processing unit in acquiring the information included in the reception target message of the second processing unit is small. Since the second processing unit outputs the information included in the reception target message of the second processing unit to the first processing unit, the first processing unit does not need to retrieve the information included in the reception target message of the second processing unit from the message. Compared to the case where the first processing unit 61 retrieves the information included in the reception target message of the second processing unit 62 from the message, the load on the first processing unit can be reduced. The in-vehicle apparatus can efficiently perform control processing due to the first processing unit and the second processing unit cooperatively performing processing.

In the in-vehicle apparatus according to an aspect of the present disclosure, the second processing unit compresses information included in the received message and outputs the compressed information to the first processing unit.

In this aspect, the information included in the reception target message of the second processing unit is compressed, and therefore the second processing unit can efficiently output the above-described information to the first processing unit.

In the in-vehicle apparatus according to an aspect of the present disclosure, the second processing unit acquires a plurality of pieces of information included in the received message, and collectively outputs the acquired plurality of pieces of information included in the message to the first processing unit.

In this aspect, the second processing unit acquires a plurality of pieces of information included in the reception target message of the second processing unit. The second processing unit outputs all of the acquired plurality of pieces of information to the first processing unit at once. Since the frequency of communication between the first processing unit and the second processing unit can be reduced, the load on the first processing unit and the second processing unit can be reduced.

In the in-vehicle apparatus according to an aspect of the present disclosure, the reception target message of the first processing unit includes a message, among the messages, that is output in response to an event.

In this aspect, a message output in response to an event, which is a so-called event message, is transmitted and received between the in-vehicle apparatus and the in-vehicle ECUs. Control processing based on the output message needs to be performed quickly in response to the event. The first processing unit receives a message output in response to an event, and performs control processing based on information included in the message. If the control processing is performed based on the information included in the message received by the first processing unit, the time from when the message is output from the in-vehicle ECU until the time when the control processing ends is shorter than in the case where the first processing unit acquires the information included in the message from the second processing unit. Since the first processing unit receives the message output in response to the event and performs control processing, the in-vehicle apparatus can quickly perform the control processing when the message output in response to the event is output.

In the in-vehicle apparatus according to an aspect of the present disclosure, the messages output by the in-vehicle ECUs include messages regarding a driving support system, the reception target message of the first processing unit includes a message including inter-vehicle data or driving force data among the messages regarding the driving support system, and the reception target message of the second processing unit includes a message including meter notification data among the messages regarding the driving support system.

In this aspect, the first processing unit receives a message including inter-vehicle data or driving force data among the messages regarding the driving support system, and performs control processing. Since the first processing unit can quickly perform control processing based on the message, it is possible to appropriately control the driving of the vehicle. Since the first processing unit acquires information based on the message including the meter notification data from the second processing unit, it is possible to suppress an increase in processing load on the first processing unit.

In the in-vehicle apparatus according to an aspect of the present disclosure, the first processing unit transmits the message including the processing result of the control processing to the in-vehicle ECU, or transmits the message including the processing result of the control processing to the in-vehicle ECU via the second processing unit, depending on the type of the message.

In this aspect, the first processing unit transmits a message including the processing result of the control processing to the in-vehicle ECUs either through or not through the second processing unit, according to the type of the message. By transmitting a message including a processing result requiring high responsiveness to the in-vehicle ECUs without going through the second processing unit, the first processing unit can quickly transmit the message to the in-vehicle ECUs. Since the in-vehicle apparatus uses two routes for message transmission, messages can be efficiently transmitted to the in-vehicle ECUs.

In the in-vehicle apparatus according to an aspect of the present disclosure, the first reception table includes information indicating the type of the reception target message of the second processing unit, the second reception table includes information indicating the type of the reception target message of the first processing unit, the first processing unit receives the reception target message of the first processing unit and the reception target message of the second processing unit based on the first reception table in response to a request from the second processing unit, and performs the control processing based on information included in the received message, and the second processing unit receives the reception target message of the first processing unit and the reception target message of the second processing unit based on the second reception table in response to a request from the first processing unit, and performs the control processing based on information included in the received message.

In this aspect, in response to a request from the second processing unit, the first processing unit receives a reception target message of the first processing unit and a reception target message of the second processing unit and performs control processing. Even if the second processing unit cannot receive the message, the first processing unit can perform control processing. In response to a request from the first processing unit, the second processing unit receives a reception target message of the first processing unit and a reception target message of the second processing unit and performs control processing. Even if the first processing unit cannot execute the control processing, the in-vehicle apparatus can cause the second processing unit to execute the control processing.

In the in-vehicle apparatus according to an aspect of the present disclosure, each message output by each in-vehicle ECU is input to the first processing unit and the second processing unit, the first processing unit and the second processing unit check an input status of the message in the first processing unit and the second processing unit through communication, and one of the first processing unit and the second processing unit detects an abnormality in a portion of wiring connecting the one of the first processing unit and the second processing unit and the in-vehicle ECU, and if the abnormality is detected, requests the other of the first processing unit and the second processing unit to receive the reception target message of the first processing unit and the reception target message of the second processing unit.

In this aspect, the message output by the in-vehicle ECU is input to the first processing unit and the second processing unit. The first processing unit and the second processing unit communicate with each other to check the input status of the message in the first processing unit and the second processing unit. If a message is input only to the second processing unit out of the first processing unit and the second processing unit, the first processing unit detects an abnormality in a part of the wiring connecting the first processing unit and the in-vehicle ECUs. If the first processing unit detects the above-described abnormality, the first processing unit requests the second processing unit to receive the reception target message of the first processing unit and the reception target message of the second processing unit. If a message is input only to the first processing unit out of the first processing unit and the second processing unit, the second processing unit detects an abnormality in a part of the wiring connecting the second processing unit and the in-vehicle ECUs. If the second processing unit detects the above-described abnormality, the second processing unit requests the first processing unit to receive the reception target message of the first processing unit and the reception target message of the second processing unit. Even if an abnormality occurs in a portion of the wiring connecting one of the first processing unit and the second processing unit to the in-vehicle ECUs, the in-vehicle apparatus can cause the other of the first processing unit and the second processing unit to execute the control processing.

An information processing method according to an aspect of the present disclosure is an information processing method in which an in-vehicle device performs information processing based on messages output by a plurality of in-vehicle ECUs, the in-vehicle device including a first processing unit that is configured to perform processing for controlling the plurality of in-vehicle ECUs and is connected to each of the plurality of in-vehicle ECUs, and a second processing unit that is connected to each of the plurality of in-vehicle ECUs and is configured to communicate with the first processing unit, in which the second processing unit receives a reception target message of the second processing unit, which is a message, among the messages, that is to be received by the second processing unit, based on a second reception table including information indicating a type of the reception target message of the second processing unit, and outputs information included in the received message to the first processing unit, and the first processing unit receives a reception target message of the first processing unit, which is a message, among the messages, that is to be received by the second processing unit, based on a first reception table including information indicating a type of the reception target message of the first processing unit, and performs control processing for controlling a vehicle based on at least one of information included in the received message and information included in the message output from the second processing unit.

In this aspect, as in the first aspect described in Paragraph [0024], the first processing unit and the second processing unit can cooperate to efficiently perform control processing.

The present disclosure will be specifically described with reference to the drawings showing the embodiments. An in-vehicle apparatus according to an embodiment of the present disclosure will be described below with reference to the drawings. Note that the present disclosure is not limited to these examples, but is indicated by the scope of the claims, and all modifications that come within the meaning and scope of equivalency to the scope of the claims are intended to be encompassed therein.

First Embodiment

Embodiments will be described below with reference to the drawings. FIG. 1 is a schematic diagram illustrating a configuration of an in-vehicle system according to a first embodiment. The in-vehicle system includes an integrated ECU 6 mounted in a vehicle C, a plurality of individual ECUs 2, and an in-vehicle device 3 connected to the individual ECUs 2. Although the vehicle C in FIG. 1 is provided with two individual ECUs 2, the number of individual ECUs 2 is not limited to two. A communication line 7 connects the integrated ECU 6 and the individual ECUs 2.

An individual ECU 2 is arranged in each area of the vehicle C. The individual ECU 2 transmits and receives signals or data to and from a plurality of in-vehicle devices 3 connected to the individual ECU 2. Also, the individual ECU 2 communicates with the integrated ECU 6. The individual ECU2 corresponds to an in-vehicle ECU.

The in-vehicle devices 3 include various sensors 5 such as a LiDAR (Light Detection and Ranging), a light sensor, a CMOS camera, and an infrared sensor, and actuators 4 such as a door opening/closing apparatus and a motor apparatus. The in-vehicle devices 3 are not limited to the above example, and may be a switch such as a door SW (switch) and a lamp SW, or may be a lamp.

The integrated ECU 6 is, for example, a central control device such as a vehicle computer. The integrated ECU 6 relays communication between the plurality of individual ECUs 2. The integrated ECU 6 and each individual ECU 2 communicate with each other. Communication between the integrated ECU 6 and the individual ECUs 2 includes transmission and reception of messages. For example, a CAN (Controller Area Network) communication protocol is used for communication, but the communication protocol used for communication is not limited to CAN. The communication protocol may also be, for example, CAN-FD (Controller Area Network with Flexible Data rate), LIN (Local Interconnect Network), Ethernet (registered trademark), or FlexRay (registered trademark). The integrated ECU 6 may also function as a relay device such as a gateway or Ethernet switch that relays communication between the plurality of individual ECUs 2. The integrated ECU 6 corresponds to an in-vehicle apparatus.

For example, the integrated ECU 6 and the individual ECUs 2 cooperate to perform drive control of the connected actuators 4. The individual ECUs 2 acquire output signals output from the sensors 5 and transmit messages generated based on the acquired output signals to the integrated ECU 6. The messages include the detection values of the sensors 5, for example. The integrated ECU 6 acquires the messages transmitted from the individual ECUs 2 and transmits messages including control information generated based on the detection values of the sensors 5 to the individual ECUs 2. The individual ECUs 2 performs drive control of the actuators 4 based on the messages including the control information transmitted from the integrated ECU 6.

Figure 2:
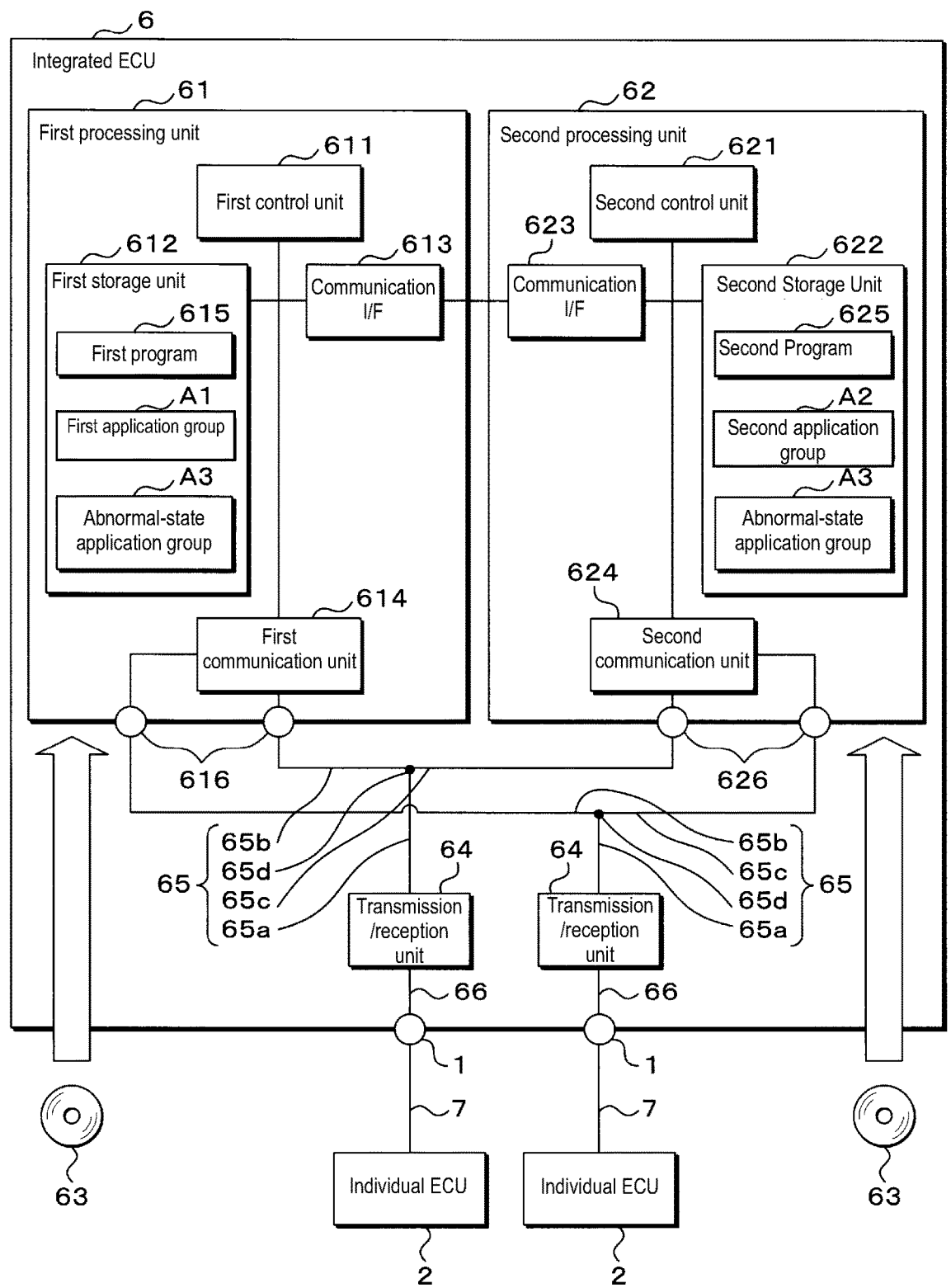
FIG. 2 is a block diagram illustrating a configuration of an integrated ECU

FIG. 2 is a block diagram illustrating a configuration of the integrated ECU 6. The integrated ECU 6 includes a first processing unit 61 and a second processing unit 62 that perform control processing for controlling the vehicle C including the control of the in-vehicle devices 3, and transmission/reception units 64 for transmitting/receiving messages to/from the individual ECUs 2. In addition, the integrated ECU 6 includes first wirings 65 that connect the first processing unit 61 and the second processing unit 62 to the transmission/reception units 64, connectors 1 to which communication lines 7 connected to the individual ECUs 2 are connected, and second wirings 66 that connect the connectors 1 and the transmission/reception units 64.

The transmission/reception unit 64 is a physical layer I/F determined based on the communication protocol. For example, if the communication protocol is Ethernet, the transmission/reception unit 64 is an Ethernet PHY unit that supports packets such as TCP/IP or UDP/IP. For example, the number of transmission/reception units 64 in the integrated ECU 6 corresponds to the number of the individual ECUs 2. TCP is an abbreviation of Transmission Control Protocol, and IP is an abbreviation of Internet Protocol. Also, UDP is an abbreviation of User Datagram Protocol.

In this embodiment, the integrated ECU 6 is provided with two transmission/reception units 64, two first wirings 65, two second wirings 66, and two connectors 1. One of the transmission/reception units 64 is connected to one of the connectors 1 by one of the second wirings 66. One of the connectors 1 is connected to a communication line 7 connected to one of the individual ECUs 2. That is, one of the transmission/reception units 64 is connected to one of the individual ECUs 2 via a second wiring 66, a connector 1, and a communication line 7. One of the transmission/reception units 64 is connected to the first processing unit 61 and the second processing unit 62 by one of the first wirings 65.

The other transmission/reception unit 64 is connected to the other connector 1 by the other second wiring 66. The other connector 1 is connected to the communication line 7 connected to the other individual ECU 2. That is, the other transmission/reception units 64 is connected to the other individual ECU 2 via a second wiring 66, a connector 1, and a communication line 7. The communication line 7 connected to one of the individual ECUs 2 and the communication line 7 connected to the other individual ECU 2 are different from each other. The other transmission/reception unit 64 is connected to the first processing unit 61 and the second processing unit 62 by the other first wiring 65. Note that the numbers of the transmission/reception units 64, the first wirings 65, the second wirings 66, and the two connectors 1 are not limited to two. A plurality of individual ECUs 2 may also be connected to each communication line 7.

The second wiring 66 is connected to the individual ECU 2 via the connector 1 and the communication line 7. The first wiring 65 is connected to the individual ECU 2 via the transmission/reception unit 64, the second wiring 66, the connector 1, and the communication line 7. The first wiring 65 is branched. The first wiring 65 includes a branch portion 65*d*, a common portion 65*a* between the branch portion 65*d* and the transmission/reception unit 64, a first portion 65*b* between the branch portion 65*d* and the first processing portion 61, and a second portion 65*c* between the branch portion 65*d* and the second processing unit 62.

The first processing unit 61 and the second processing unit 62 are individual processors. In this embodiment, an example is described in which the first processing unit 61 and the second processing unit 62 are individual microcontrollers. Note that the first processing unit 61 and the second processing unit 62 are not limited to microcontrollers. The first processing unit 61 and the second processing unit 62 are connected, and communicate using a communication I/F (interface) 613 included in the first processing unit 61 and a communication I/F 623 included in the second processing unit 62. In this embodiment, an example is described in which the performance of the first processing unit 61 is higher than that of the second processing unit 62, but the performances of the first processing unit 61 and the second processing unit 62 may also be the same. The performance of the first processing unit 61 and the second processing unit 62 includes processing capability and memory capacity.

The first processing unit 61 includes a connection portion 616 connected to the first wiring 65. The second processing unit 62 includes a connection portion 626 connected to the first wiring 65. As described above, the first processing unit 61 and the second processing unit 62 are connected to the respective transmission/reception units 64 by the first wirings 65. Accordingly, each of the first processing unit 61 and the second processing unit 62 is connected to one of the individual ECUs 2 via one of the first wirings 65, one of the transmission/reception units 64, one of the second wirings 66, and one of the communication lines 7. Each of the first processing unit 61 and the second processing unit 62 is connected to the other individual ECU 2 via the other first wiring 65, the other transmission/reception unit 64, the other second wiring 66, and the other communication line 7. In other words, each of the first processing unit 61 and the second processing unit 62 is connected to the plurality of individual ECUs 2. Both the first processing unit 61 and the second processing unit 62 can transmit and receive messages with each individual ECU 2.

The first processing unit 61 transmits and receives messages to and from the individual ECUs 2 via the first portions 65b and the common portions 65a included in the first wirings 65, the transmission/reception units 64, the second wirings 66, and the communication lines 7. Hereinafter, a route between an individual ECU 2 and the first processing unit 61 that passes through a first portion 65b and a common portion 65a included in a first wiring 65, a transmission/reception unit 64, a second wiring 66, and a communication line 7 is also referred to as a first route. The second processing unit 62 transmits and receives messages to and from the individual ECUs 2 via the second portions 65c and the common portions 65a included in the first wirings 65, the transmission/reception units 64, the second wirings 66, and the communication lines 7. Hereinafter, a route between an individual ECU 2 and the second processing unit 62 that passes through a second portion 65c and a common portion 65a included in a first wiring 65, a transmission/reception unit 64, a second wiring 66, and a communication line 7 is also referred to as a second route.

A message output from the individual ECU 2 is input to both the first processing unit 61 and the second processing unit 62 via the first route and the second route. A message includes an identifier such as a message ID and information such as a detection value of the sensor 5. The information included in the message may also include the current value of the current flowing through the actuator 4. Although the details will be described later, the first processing unit 61 receives some of the input messages. The second processing unit 62 receives messages that are not received by the first processing unit 61 among the input messages. That is, the second processing unit 62 receives the rest of the input messages. Hereinafter, the messages to be received by the first processing unit 61 will also be referred to as reception target messages for the first processing unit 61. The remaining messages to be received by the second processing unit 62 will also be referred to as reception target messages for the second processing unit 62.

The second processing unit 62 acquires the information included in the received reception target message of the second processing unit 62. For example, the second processing unit 62 retrieves the detection value of the sensor 5 included in the received reception target message of the second processing unit 62 from the message as the information included in the reception target message of the second processing unit 62. The second processing unit 62 outputs, to the first processing unit 61, the information included in the acquired reception target message of the second processing unit 62.

The first processing unit 61 acquires the above-described information output from the second processing unit 62 and performs control processing based on the acquired information. The first processing unit 61 also acquires the information included in the received reception target message of the first processing unit 61, for example, the detection value of the sensor 5. The first processing unit 61 performs control processing based on the information included in the acquired reception target message of the first processing unit 61. For example, the first processing unit 61 generates control information for controlling driving of the actuator 4 through control processing.

The first processing unit 61 transmits the processing result of the control processing, for example, a message including control information, to the individual ECUs 2 via the first routes. Alternatively, the first processing unit 61 outputs a message including control information to the second processing unit 62. The second processing unit 62 transmits the output message to the individual ECUs 2 via the second routes. The individual ECUs 2 receive the message transmitted from the first processing unit 61 and control the driving of the actuators 4 based on the control information included in the received message.

In response to a request from the second processing unit 62, the first processing unit 61 receives a reception target message of the first processing unit 61 and a reception target message of the second processing unit 62, and performs control processing based on the information included in the received messages. The first processing unit 61 transmits a message including the processing result to the individual ECUs 2 via the first routes.

In response to a request from the first processing unit 61, the second processing unit 62 receives the reception target message of the first processing unit 61 and the reception target message of the second processing unit 62 and performs control processing based on the information included in the received messages. The second processing unit 62 transmits a message including the processing result to the individual ECUs 2 via the second routes.

The reception target message of the first processing unit 61 and the reception target message of the second processing unit 62 are set in advance according to the type of the message. The types of messages will be described below. FIGS. 3 and 4 are explanatory diagrams illustrating examples of types of messages transmitted and received between the integrated ECU 6 and the individual ECUs 2. The explanatory diagram of FIG. 3 shows the concept of the types of the messages. Messages transmitted and received between the integrated ECU 6 and the individual ECUs 2 include two types of messages, namely control messages for controlling the vehicle C and diagnostic messages for diagnosing failures of the in-vehicle device 3.

Generally, when a message is acquired, security-related processing is performed on the message to check whether or not the retrieved message is normal. For example, security-related processing includes message ID confirmation and transmission period confirmation. If an abnormality is detected in a message, a response to the abnormality, for example, processing for stopping the operation of the engine or processing for transmitting a message indicating the abnormality in the message to an external server provided outside the vehicle C, is performed.

Control messages are classified according to their responsiveness to security-related processing (hereafter referred to as security responsiveness). Specifically, the control messages include messages with high security responsiveness and messages with low security responsiveness. A message with high security responsiveness is a message for which detection of an abnormality in the message and response to the abnormality need to be performed within a certain period of time. A message with low security responsiveness is a message for which detection of an abnormality in the message and response to the abnormality do not need to be performed within a certain period of time. The certain period of time can be set as appropriate.

Each of the high security responsiveness message and the low security responsiveness message includes a high-priority message with a high priority level of processing and a low-priority message with a lower priority level of processing than the high priority message. A high-priority message is a message that requires a quick response. A high-priority message requires a short communication delay time.

In general, messages are output periodically, but some messages are output irregularly in response to events such as operation of the vehicle by a driver or detection by sensors, in addition to the periodic output. Hereinafter, among the messages, a message output in response to an event will also be referred to as a message with an event. A message with an event is a so-called event message. Note that a message with an event need not be output periodically, and may be output irregularly. Hereinafter, among messages, a message that is output regardless of an event is also referred to as a message without an event. Each of the high-priority messages and the low-priority messages included in the messages with high security responsiveness is classified according to whether they are output in response to an event. That is, each of the high-priority message and the low-priority message included in the high-security responsiveness message is classified according to whether or not there is an event. FIG. 3 shows whether or not there is an event for each message.

Each of the high-priority messages and the low-priority messages included in the messages with high security responsiveness is classified according to the transmission period in addition to whether or not there is an event. Specifically, the messages include messages with a transmission period shorter than a predetermined period and messages with a transmission period greater than or equal to the predetermined period. Messages are also classified by data amount. Messages whose transmission period is shorter than the predetermined period and messages whose transmission period is greater than or equal to the predetermined period include messages with a data amount smaller than a predetermined amount and messages with a data amount greater than or equal to the predetermined amount.

Each of the high-priority messages and low-priority messages included in the low-security responsiveness messages is also classified according to whether or not there is an event, the transmission period, and the data amount.

A diagnostic message is a so-called diagnosis message. Security responsiveness to diagnostic messages is generally low. Diagnostic messages include high-priority messages and low-priority messages.

Each message described above is transmitted and received between the individual ECUs 2 and the first processing unit 61 or the second processing unit 62. FIG. 3 shows the transmitters/recipients indicating which of the first processing unit 61 and the second processing unit 62 transmits/receives each message in the integrated ECU 6. Transmission and reception of a message whose transmitter/recipient is the first processing unit 61 is performed by the first processing unit 61 via the first route. Transmission and reception of a message whose transmitter/recipient is the second processing unit 62 is performed by the second processing unit 62 via the second route. For example, in FIG. 3, the transmitter/recipient of a message with an event is the first processing unit 61. A message with an event is transmitted and received by the first processing unit 61 via the first route. For example, a message with high security responsiveness and a transmission period shorter than a predetermined period is transmitted and received by the first processing unit 61 via the first route. A message having a data amount smaller than a predetermined amount and having a transmission period shorter than a predetermined period is transmitted and received by the first processing unit 61 via the first route. A high-priority message among diagnostic messages is transmitted and received by the first processing unit 61 via the first route.

The explanatory diagram of FIG. 4 shows specific examples of message types. FIG. 4 shows message types and message transmitters/recipients. The control messages of the messages include Advanced Driver-Assistance System (ADAS)—related messages, airbag-related messages, body control-related messages, and navigation system-related messages. Furthermore, the control messages include travel-related messages and vehicle information-related messages.

Advanced driver assistance system-related messages include inter-vehicle data messages, drive force data messages, and meter notification data messages. The inter-vehicle data indicates, for example, the distance between the vehicle C and another vehicle. The inter-vehicle data includes cruise control inter-vehicle data. The driving force data includes information on the engine driving force and information on the motor driving force. The meter notification data includes information on vehicle speed for display and information on warning lights and indicator lights. A message of inter-vehicle data and a message of driving force data are transmitted and received by the first processing unit 61 via the first route. A message of meter notification data is transmitted and received by the second processing unit 62 via the second route. Advanced driver assistance system-related messages correspond to driver assistance system-related messages.

The airbag-related messages include messages of collision detection data, messages of airbag function status data, and messages of meter notification data. Collision detection data is data for notifying that the vehicle C has collided with an object such as another vehicle. The airbag function state data includes information on a D seat front collision state, a P seat front collision state, and a front seat LR state. The meter notification data includes information on vehicle speed for display and information on warning lights and indicator lights. A message of collision detection data and a message of airbag function state data are transmitted and received by the first processing unit 61. A message of meter notification data is transmitted and received by the second processing unit 62.

The body control-related data includes a message of courtesy SW data, a message of seating data, a message of lamp illumination data, a message of mirror-related data, and a message of power slide data. The courtesy SW data indicates the open/closed state of the doors of the vehicle C. The seating data indicates whether or not each seat of the vehicle C is occupied by a person. The lamp illumination data is data for turning on or off the lamps mounted on the vehicle C. The mirror-related data includes information about the retracted or non-retracted state of the mirror and angle data of the mirror. The power slide data is data for opening and closing a power slide door provided in the vehicle C. A message of courtesy SW data, a message of seating data, and a message of lamp illumination data are transmitted and received by the first processing unit 61. A message of mirror-related data and a message of power slide data are transmitted and received by the second processing unit 62.

Navigation system-related messages include messages of drive recorder data and messages of meter notification data.

A message of drive recorder data and a message of meter notification data are transmitted and received by the second processing unit 62.

Travel-related messages include messages of accelerator state data, messages of shift state data, and messages of brake state data. The accelerator state data indicates the degree of depression of the accelerator pedal by the driver. The shift state data indicates the state of the shift lever. The brake state data indicates the degree of depression of the brake pedal by the driver. A message of accelerator state data, a message of shift state data, and a message of brake state data are transmitted and received by the first processing unit 61.

Vehicle information-related messages include messages of vehicle code data, messages of delivery data, and messages of drive method data. Vehicle code data indicates the vehicle identification number assigned to the vehicle C. Delivery data includes information about the exporting country and exporting region. The drive method data includes information on the engine drive force and information on the motor drive force. A message of vehicle code data message, a message of delivery data, and a message of drive method data are transmitted and received by the second processing unit 62.

Diagnostic messages include messages of data subject to regulation, messages of data not subject to regulation, and messages of freeze frame data. Messages of data subject to regulation are transmitted and received by the first processing unit 61. Messages of data not subject to regulation and messages of freeze frame data are transmitted and received by the second processing unit 62.

In FIGS. 3 and 4, a message whose transmitter/recipient is the first processing unit 61 is included in the reception target messages for the first processing unit 61. Reception target messages for the first processing unit 61 include messages that require high responsiveness. A message whose transmitter/recipient is the second processing unit 62 is included in the reception target messages for the second processing unit 62.

As shown in FIG. 2, the first processing unit 61 includes a first control unit 611, a first storage unit 612, a communication I/F 613, and a first communication unit 614. The first control unit 611, the first storage unit 612, the communication I/F 613, and the first communication unit 614 are connected. The first control unit 611 is a computation processing apparatus such as a CPU (Central Processing Unit) or MPU (Micro Processing Unit). The first control unit 611 reads out and executes a first program 615 and data stored in advance in the first storage unit 612, thereby performing various types of control processing, computation processing, and the like. For example, the first control unit 611 performs security-related processing on the received message.

The first storage unit 612 is constituted by a volatile memory element such as RAM (Random Access Memory) or a non-volatile memory element such as ROM (Read Only Memory), EEPROM (Electrically Erasable Programmable ROM), or flash memory. The first storage unit 612 stores, in advance, a first program 615 executed by the first control unit 611 and data that the first control unit 611 refers to during processing. The first program 615 stored in the first storage unit 612 may also be the first program 615 read out from the recording medium 63, which is readable by the integrated ECU 6. Also, the first program 615 may be downloaded from an external computer (not shown) connected to a communication network (not shown), and stored in the first storage unit 612.

The first storage unit 612 stores a plurality of applications. The first storage unit 612 of FIG. 2 stores a first application group A1 including a plurality of applications to be executed by the first control unit 611 if no later-described abnormality is detected, and an abnormal-state application group A3 including a plurality of applications to be executed if an abnormality is detected. The first application group A1 and the abnormal-state application group A3 may also be included in the first program 615.

The communication I/F 613 is a communication interface for communicating with the second processing unit 62. The communication I/F 613 is connected to the communication I/F 623 included in the second processing unit 62.

The first communication unit 614 is an input/output interface using a predetermined communication protocol. For example, if the predetermined communication protocol is the CAN communication protocol, the first communication unit 614 is a CAN controller and a CAN receiver. Note that the predetermined communication protocol is not limited to the CAN communication protocol. The first communication unit 614 is connected to the connection portion 616. The first control unit 611 communicates with each individual ECU 2 via the first communication unit 614.

Figure 5:
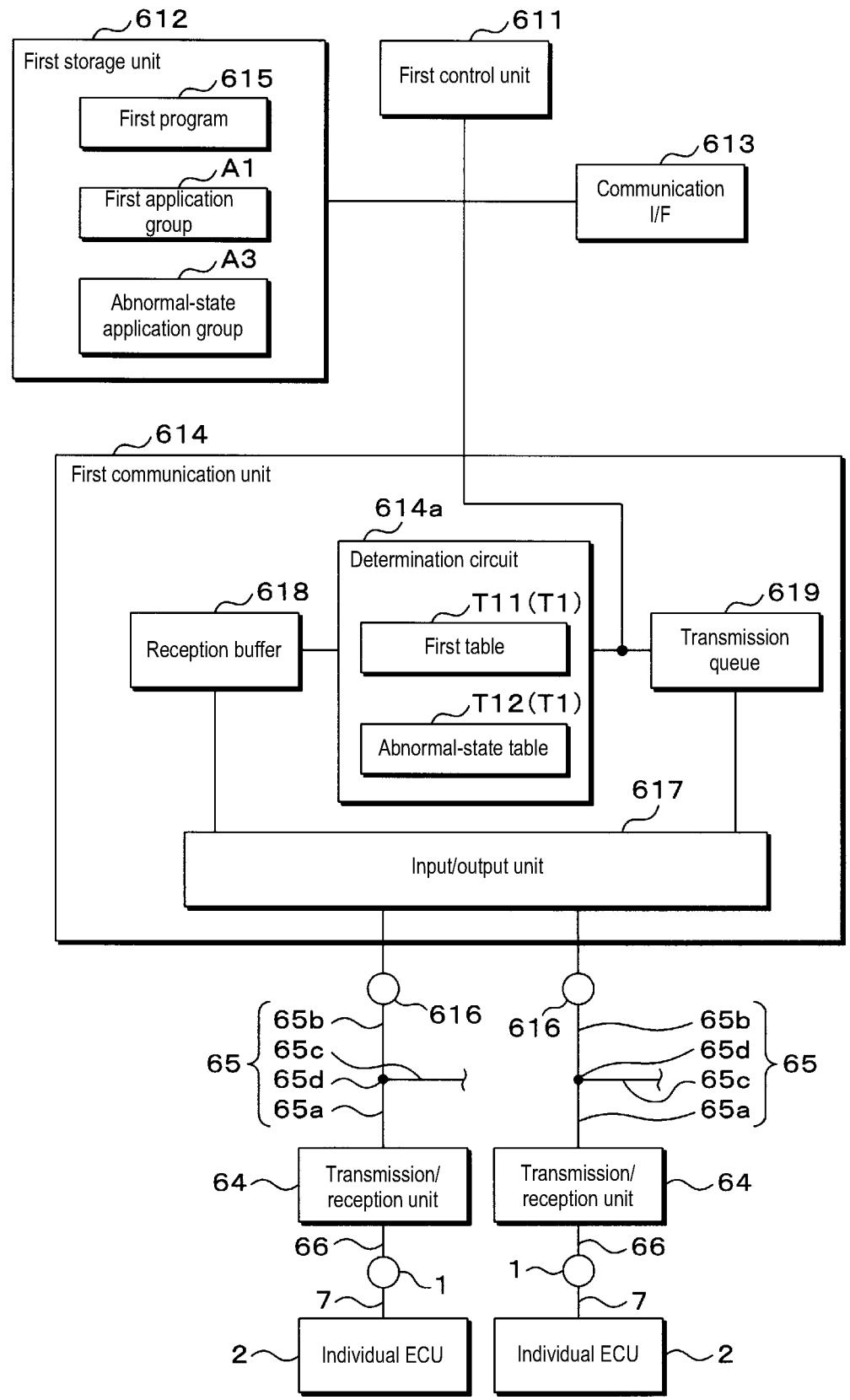
FIG. 5 is a block diagram illustrating a configuration of a first communication unit.

FIG. 5 is a block diagram illustrating the configuration of the first communication unit 614. The first communication unit 614 includes an input/output unit 617, a reception buffer 618, a transmission queue 619, and a determination circuit 614*a*. The input/output unit 617 is, for example, pins of a microcomputer. The input/output unit 617 is connected to the connection portion 616. The input/output unit 617 is connected to the individual ECUs 2 via the connection portions 616, the first wirings 65, the transmission/reception units 64, the second wirings 66, and the communication lines 7, and outputs messages to the individual ECUs 2. Also, the input/output unit 617 receives messages output from the individual ECUs 2.

The reception buffer 618 is connected to the input/output unit 617 and the determination circuit 614*a*. The reception buffer 618 stores the messages input to the input/output unit 617.

The transmission queue 619 is connected to the input/output unit 617, the determination circuit 614*a*, and the first control unit 611. The transmission queue 619 is a memory (queue) that temporarily stores messages to be transmitted. In this embodiment, the transmission queue 619 has a plurality of queues corresponding to transmission destinations. Specifically, the transmission queue 619 has a queue for transmitting messages to one individual ECU 2 and a queue for transmitting messages to the other individual ECU 2.

The determination circuit 614*a* is connected to the first control unit 611. The determination circuit 614*a* has a first reception table T1 including a first table T11 and an abnormal-state table T12. The first table T11 includes information indicating the types of reception target messages for the first processing unit 61. The abnormal-state table T12 includes information indicating the type of reception target message of the first processing unit 61 and information indicating the type of reception target message of the second processing unit 62. Information indicating the type of message in this embodiment is a message ID. Note that information indicating the type of message is not limited to the message ID.

The determination circuit 614*a* refers to the first reception table T1 and outputs the message stored in the reception buffer 618 to the first control unit 611 based on the first table T11 or the abnormal-state table T12. Normally, for example, after starting up the first processing unit 61, the determination circuit 614a refers to the first table T11. Under the control of the first control unit 611, the first reception table T1 referred to by the determination circuit 614a is switched from the first table T11 to the abnormal-state table T12. Under the control of the first control unit 611, the first reception table T1 referred to by the determination circuit 614a may also be switched from the abnormal-state table T12 to the first table T11.

A case where the determination circuit 614a refers to the first table T11 will be described below. FIG. 6 is a conceptual diagram showing an example of contents of the first table T11. The first table T11 in FIG. 6 includes a message ID column and a recipient column. In the first table T11, among the messages output from the individual ECU 2, the message ID of the reception target message of the first processing unit 61 and the recipient of the message are stored in association with each other. The recipient indicates which of the first processing unit 61 and the second processing unit 62 in the integrated ECU 6 is to receive the message.

The message ID of the reception target message of the first processing unit 61 is stored in the message ID column of the first table T11. Since the message ID of the reception target message of the first processing unit 61 is stored in the first table T11, the first processing unit 61 is stored as the recipient in the recipient column. Note that the recipient column is shown for description in FIG. 6, and therefore the first table T11 does not need to include the recipient column.

The determination circuit 614a outputs to first control unit 611 the message having the message ID stored in first table T11 among the messages stored in reception buffer 618. That is, the determination circuit 614a outputs to the first control unit 611 the reception target messages for the first processing unit among the messages input to the first communication unit 614, based on the first table T11. The first control unit 611 acquires the output reception target message of the first processing unit 61. That is, the first processing unit 61 receives the reception target message of the first processing unit 61.

Next, a case where the determination circuit 614a refers to the abnormal-state table T12 will be described. FIG. 7 is a conceptual diagram showing an example of contents of the abnormal-state table T12. The abnormal-state table T12 in FIG. 7 includes a message ID column and a recipient column. The message ID of the message output from the individual ECU 2 and the recipient of the message are stored in association with each other in the abnormal-state table T12. Specifically, the message ID of the reception target message of the first processing unit 61 and the message ID of the reception target message of the second processing unit 62 are stored in the message ID column of the abnormal-state table T12. The first processing unit 61 or the second processing unit 62 is stored in the recipient column as the recipient. Note that the recipient column is shown in FIG. 7 for the sake of description, and therefore the abnormal-state table T12 does not need to include the recipient column.

The determination circuit 614a outputs, to the first control unit 611, the message with the message ID stored in the abnormal-state table T12 among the messages stored in reception buffer 618. That is, based on the abnormal-state table T12, the determination circuit 614a outputs the reception target message of the first processing unit 61 and the reception target message of the second processing unit 62 among the messages input to the first communication unit 614 to the control unit 611. The first control unit 611 acquires the output reception target message of the first processing unit 61 and the reception target message of the second processing unit 62. That is, the first processing unit 61 receives the reception target message of the first processing unit 61 and the reception target message of the second processing unit 62.

When a message is input to the first communication unit 614, the determination circuit 614a outputs, to the first control unit 611, a signal indicating the input of the message. When a specific message is input to the first communication unit 614, the determination circuit 614a may also output, to the first control unit 611, a signal indicating the input of the specific message. In this case, the message ID of the specific message is stored in the first communication unit 614. The specific message includes, for example, a message for abnormality detection, which will be described later. When a message is input to the first communication unit 614, a component of the first communication unit 614 other than the determination circuit 614a may output the above signal to the first control unit 611.

As described above, the determination circuit 614a normally refers to the first table T11 and outputs a reception target message of the first processing unit 61 to the first control unit 611. The first control unit 611 receives the output reception target message of the first processing unit 61. The first control unit 611 acquires the information included in the received reception target message of the first processing unit 61. For example, the first control unit 611 acquires the detection value of the sensor 5 included in the received reception target message of the first processing unit 61 as the information included in the reception target message of the first processing unit 61.

The information included in the reception target message of the second processing unit 62 is output from the second processing unit 62 to the first control unit 611. For example, multiple pieces of information are compiled, compressed, and output from the second processing unit 62. The first control unit 611 acquires the above-described information output from the second processing unit 62. The first control unit 611 decompresses the above-mentioned compressed information and acquires a plurality of pieces of information included in the reception target message of the second processing unit 62.

The first control unit 611 uses an application included in first application group A1 to perform control processing based on information included in the acquired reception target message of first processing unit 61. Also, the first control unit 611 uses an application included in the first application group A1 to perform control processing based on information included in the acquired reception target message of the second processing unit 62. Also, the first control unit 611 uses an application included in first application group A1 to perform control processing based on the information included in the reception target message of first processing unit 61 and the information included in the reception target message of the second processing unit 62.

The applications included in the first application group A1 include some applications among applications for which information included in a reception target message of first processing unit 61 is used for control processing, and applications for which information included in a reception target message of second processing unit 62 is used for control processing. The applications included in the first application group A1 include applications in which the information included in the reception target message of the first processing unit 61 and the information included in the reception target message of the second processing unit 62 are used for control processing.

The first control unit 611 transmits a message including the processing result of the control processing to the individual ECU 2 according to the type of the message. Types of messages including processing results are classified as shown in FIGS. 3 and 4. If the type of the message including the processing result is a message that is to be transmitted and received by the first processing unit 61, the first control unit 611 uses the first communication unit 614 to transmit the message including the processing result to the individual ECU 2 via the first route. Specifically, the first control unit 611 outputs the above message to the transmission queue 619. The message output to the transmission queue 619 is transmitted from the transmission queue 619 to the individual ECU 2 that is the transmission destination via the first route.

If the type of the message including the processing result is a message that is to be transmitted and received by the second processing unit 62, the first control unit 611 outputs the message including the processing result to the second processing unit 62 via the communication I/F. The second processing unit 62 transmits the message output from the first control unit 611 to the individual ECU 2 via the second route. That is, the first control unit 611 transmits a message including the processing result to the individual ECU 2 via the second processing unit 62 and the second route. The first control unit 611 may also output the processing result to the second processing unit 62. The second processing unit 62 transmits a message including the output processing result to the individual ECU 2 via the second route.

For example, the first storage unit 612 stores a transmission table including transmission routes of messages including processing results. FIG. 8 is a conceptual diagram showing an example of contents of a transmission table. Information indicating the type of message, such as a message ID, and the transmission route of the message are stored in association with each other in the transmission table. The transmission table in FIG. 8 includes a message ID column and a transmission route column.

The transmission table stores message IDs of messages including processing results in association with transmission routes of the messages. Specifically, the message ID of the message including the processing result is stored in the message ID column of the transmission table. Either the first route or the second processing unit 62 and the second route is stored as the transmission route in the transmission route column. The first control unit 611 refers to the transmission table and transmits a message including the processing result to the individual ECU 2 via the first route, or transmits a message including the processing result to the individual ECU 2 via the second processing unit 62 and the second route. Hereinafter, the transmission of the message including the processing result by the first control unit 611 to the individual ECU 2 is also referred to as transmission of the processing result by the first control unit 611 to the individual ECU 2.

The first control unit 611 acquires a request signal output from the second processing unit 62 via the communication I/F 613. The request signal is a signal for requesting switching of the first reception table T1 or a second reception table T2, which will be described later. Although details will be described later, a request signal is output from the second processing unit 62 if there is an abnormality in communication between the second processing unit 62 and the individual ECU 2. If the first control unit 611 acquires the request signal, the first control unit 611 switches the first reception table T1 referred to by the determination circuit 614*a* from the first table T11 to the abnormal-state table T12. The determination circuit 614*a* refers to the abnormal-state table T12 and outputs the reception target message of the first processing unit 61 and the reception target message of the second processing unit 62 to the first control unit 611. The first control unit 611 receives the messages output from the determination circuit 614*a* and acquires the information based on the received messages.

The first control unit 611 uses an application included in the abnormal-state application group A3 to perform control processing based on the information included in the received message. The first control unit 611 transmits a message including the processing result of the control processing to the individual ECU 2 via the first route. The abnormal-state application group A3 includes the applications included in the first application group A1 and the applications included in the second application group A2, which will be described later. More specifically, the abnormal-state application group A3 includes applications for which information included in a reception target message of the first processing unit 61 is used for control processing, and applications for which information included in a reception target message of the second processing unit 62 is used for control processing. The abnormal-state application group A3 includes applications in which information included in a reception target message of the first processing unit 61 and information included in a reception target message of the second processing unit 62 are used for control processing.

Although the details will be described later, the first control unit 611 detects a change in the state of the first portions 65*b* included in the first wirings 65, for example, an abnormality of the first portions 65*b*. The first control unit 611 outputs a request signal to the second processing unit 62 via the communication I/F 613 if an abnormality in the first portions 65*b* is detected.

As shown in FIG. 2, the second processing unit 62 includes connection portions 626 connected to the first wirings 65. Furthermore, the second processing unit 62 includes a second control unit 621, a second storage unit 622, a communication I/F 623, and a second communication unit 624. The second control unit 621, the second storage unit 622, the communication I/F 623, and the second communication unit 624 are connected to each other. The second control unit 621 is constituted by a computation processing device such as a CPU or MPU, and performs various types of control processing, computation processing, and the like by reading out and executing a second program 625 and data stored in advance in the second storage unit 622. For example, the second control unit 621 performs security-related processing on the received message.

The second storage unit 622 is constituted by a volatile memory element such as RAM, or a non-volatile memory element such as ROM, EEPROM, or flash memory. The second storage unit 622 stores in advance a second program 625 executed by the second control unit 621 and data that the second control unit 621 refers to during processing. The second program 625 stored in the second storage unit 622 may also be the second program 625 read out from the recording medium 63 that is readable by the integrated ECU 6. Also, the second program 625 may be downloaded from an external computer (not shown) connected to a communication network (not shown) and stored in the second storage unit 622.

A plurality of applications are stored in the second storage unit 622. The second storage unit 622 in FIG. 2 includes the second application group A2 including a plurality of applications to be executed by the second control unit 621 if no abnormality is detected, and the abnormal-state application group A3. The second application group A2 and the abnormal-state application group A3 may also be included in the second program 625.

The communication I/F 623 is a communication interface for communicating with the first processing unit 61 and is connected to the communication I/F 613. The first control unit 611 and the second control unit 621 communicate via the communication I/F 613 and the communication I/F 623. That is, the first processing unit 61 and the second processing unit 62 communicate via the communication I/F 613 and the communication I/F 623. For example, the first processing unit 61 and the second processing unit 62 perform serial communication, but the communication between the first processing unit 61 and the second processing unit 62 is not limited to serial communication.

The second communication unit 624 is an input/output interface using a predetermined communication protocol. If the predetermined communication protocol is CAN, the second communication unit 624 is, for example, a CAN controller and a CAN receiver. The second communication unit 624 is connected to the connection portion 626. The second control unit 621 communicates with the individual ECUs 2 via the second communication unit 624.

Figure 9:
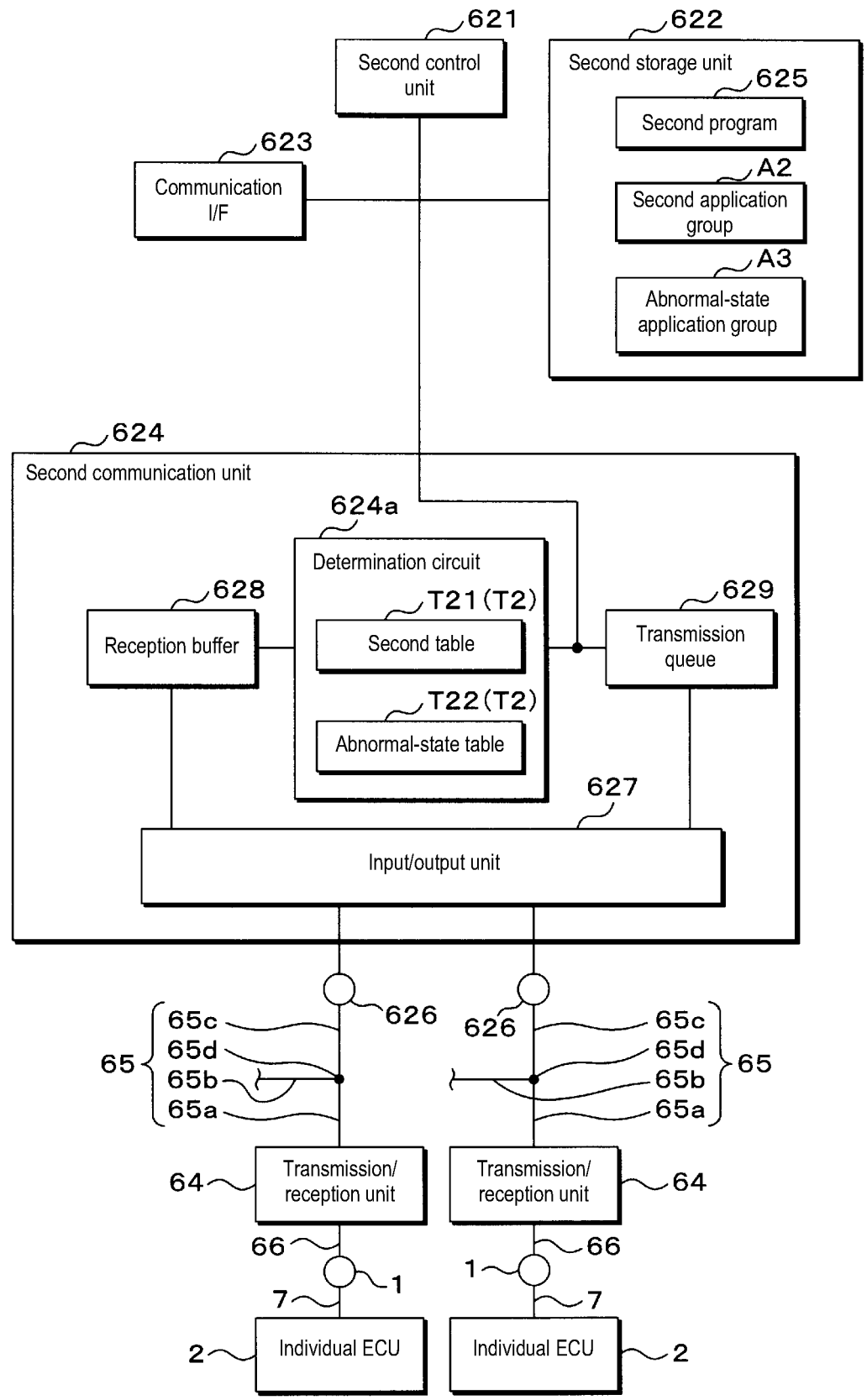
FIG. 9 is a block diagram illustrating a configuration of a second communication unit.

FIG. 9 is a block diagram illustrating the configuration of the second communication unit 624. The second communication unit 624 includes an input/output unit 627, a reception buffer 628, a transmission queue 629, and a determination circuit 624a. The input/output unit 627 is connected to the reception buffer 628 and the transmission queue 629. The input/output unit 627 is, for example, pins of a microcomputer. The input/output unit 627 is connected to each individual ECU 2 via the connection unit 626, the first wiring 65, the transmission/reception unit 64, the second wiring 66, and the communication line 7, and outputs messages to the individual ECU 2. Also, a message output from the individual ECU 2 is input to the input/output unit 627.

The reception buffer 628 and transmission queue 629 are connected to the determination circuit 624a. A message input to the input/output unit 627 is stored in the reception buffer 628. The transmission queue 629 is connected to the second control unit 621. The transmission queue 629 is a queue that temporarily stores messages to be relayed. Like the transmission queue 619, the transmission queue 629 has a plurality of queues corresponding to relay destinations.

The determination circuit 624a is connected to the second control unit 621. The determination circuit 624a has a second reception table T2 including a second table T21 and an abnormal-state table T22. The second table T21 includes message IDs of reception target messages for the second processing unit 62. The abnormal-state table T22 includes message IDs of reception target messages for the first processing unit 61 and message IDs of reception target messages for the second processing unit 62.

The determination circuit 624a refers to the second reception table T2 and outputs the message stored in the reception buffer 628 to the second control unit 621 based on the second table T21 or the abnormal-state table T22. Normally, for example, after starting up the second processing unit 62, the determination circuit 624a refers to the second table T21. Under the control of the second control unit 621, the second reception table T2 referred to by the determination circuit 624a is switched from the second table T21 to the abnormal-state table T22. The second reception table T2 referred to by the determination circuit 624a may also be switched from the abnormal-state table T22 to the second table T21 under the control of the second control unit 621.

A case where the determination circuit 624a refers to the second table T21 will be described below. FIG. 10 is a conceptual diagram showing an example of contents of the second table T21. The second table T21 in FIG. 10 includes a message ID column and a recipient column. In the second table T21, the message ID of the reception target message of the second processing unit 62 among the messages output from the individual ECU 2, and the recipient of the message are stored in association with each other. Specifically, the message ID of the reception target message of the second processing unit 62 is stored in the message ID column of the second table T21. Since the message ID of the reception target message of the second processing unit 62 is stored in the second table T21, the second processing unit 62 is stored as the recipient in the recipient column. Note that since the recipient column is shown for description in FIG. 10, the second table T21 does not need to include the message recipient column.

The determination circuit 624a outputs the message of the message ID stored in the second table T21 among the messages stored in the reception buffer 628 to the second control unit 621. That is, based on the second table T21, the determination circuit 624a outputs the reception target message of the second processing unit 62 among the messages input to the second communication unit 624 to the second control unit 621. The second control unit 621 acquires the output reception target message of the second processing unit 62. That is, the second processing unit 62 receives the reception target message of the second processing unit 62.

Next, the case where the determination circuit 624a refers to the abnormal-state table T22 will be described. Since the abnormal-state table T22 is the same as the abnormal-state table T12 included in the first reception table T1, detailed description of the abnormal-state table T22 will be omitted.

The determination circuit 624a outputs the messages stored in the abnormal-state table T22 among the messages stored in the reception buffer 628 to the second control unit 621. That is, based on the abnormal-state table T22, the determination circuit 624a outputs the reception target message of the first processing unit 61 and the reception target message of the second processing unit 62 among the messages input to the second communication unit 624 to the second control unit 621. The second control unit 621 acquires the output reception target message of the first processing unit 61 and the reception target message of the second processing unit 62. That is, the second processing unit 62 receives the reception target message of the first processing unit 61 and the reception target message of the second processing unit 62.

When a message is input to the second communication unit 624, the determination circuit 624a outputs, to the second control unit 621, a signal indicating input of the message. When a specific message is input to the second communication unit 624, the determination circuit 624a may output, to the second control unit 621, a signal indicating input of the specific message. In this case, the message ID of the message is stored in the second communication unit 624. When a message is input to the second communication unit 624, a component of the second communication unit 624 other than the determination circuit 624a may also output the above-described signal to the second control unit 621.

As described above, the determination circuit 624a normally refers to the second table T21 and outputs the reception target message of the second processing unit 62 to the second control unit 621. The second control unit 621 receives the output reception target message of the second processing unit 62. The second control unit 621 acquires information included in the received reception target message of the second processing unit 62. For example, the second control unit 621 acquires the detection value of the sensor 5 included in the received reception target message of the second processing unit 62 as information included in the reception target message of the second processing unit 62.

The second control unit 621 outputs information included in the reception target message of the second processing unit 62 to the first control unit 611 via the communication I/F 623. For example, the second control unit 621 acquires multiple pieces of information included in the reception target message of the second processing unit 62. When the number of acquired pieces of information reaches a predetermined number, the second control unit 621 outputs the plurality of pieces of information to the first control unit 611 as follows. The second control unit 621 compiles the above multiple pieces of information into one piece of data, and compresses the compiled pieces of information. For example, LSB (Least Significant Bit) conversion is used for compression. The second control unit 621 outputs the compressed information to the first control unit 611. Note that the second control unit 621 may also output information to the first control unit 611 without compressing it. The second control unit 621 may also output the plurality of pieces of information to the first control unit 611 one by one.

The second control unit 621 outputs the above information to the first control unit 611 through communication via the communication I/F 613 and the communication I/F 623. Any communication protocol can be used for communication via the communication I/F 613 and the communication I/F 623.

The second control unit 621 acquires a message including the processing result output from the first control unit 611 via the communication I/F 613 and the communication I/F 623. The second processing unit 62 transmits the message obtained from the first control unit 611 to the individual ECU 2 via the second route. Specifically, the second control unit 621 outputs the above-described message to the transmission queue 629. The message output to the transmission queue 629 is transmitted from the transmission queue 629 to the individual ECU 2 that is the destination via the second route.

For example, the second control unit 621 refers to the message ID of a predetermined message stored in advance in the second storage unit 622, and determines whether or not the received reception target message of the second processing unit 62 is a predetermined message. If the message received by second control unit 621 is a predetermined message, the second control unit 621 uses an application included in the second application group A2 to perform control processing based on information included in the predetermined message. The second control unit 621 transmits a message including the processing result of the control processing to the individual ECU 2 via the second route. Note that the second control unit 621 may also output a message including the processing result to the first control unit 611. The first control unit 611 transmits a message including the processing result output from the second control unit 621 to the individual ECU 2 via the first route.

The applications included in the second application group A2 include the remaining applications among the applications for which the information included in the reception target message of the second processing unit 62 is used for control processing. That is, the applications included in the second application group A2 include applications not included in the first application group A1, among the applications for which the information included in the reception target message of the second processing unit 62 is used in control processing. The information included in the predetermined message is used for control processing in which the applications included in the second application group A2 are used.

The second control unit 621 acquires the request signal output from the first processing unit 61 via the communication I/F 623. If the request signal has been acquired, the second control unit 621 switches the second reception table T2 referred to by the determination circuit 624*a* from the second table T21 to the abnormal-state table T22. The determination circuit 624*a* refers to the abnormal-state table T22 and outputs a reception target message of the first processing unit 61 and a reception target message of the second processing unit 62 to the second control unit 621. The second control unit 621 receives the message output from the determination circuit 624*a* and acquires information included in the received message.

The second control unit 621 uses the applications included in the abnormal-state application group A3 to perform control processing based on the information included in the received message. The second control unit 621 transmits a message including the processing result of the control processing to the individual ECU 2 via the second route.

The second control unit 621 detects a state change of the second portion 65*c* included in the first wiring 65, for example, an abnormality of the second portion 65*c*. The second control unit 621 outputs a request signal to the first control unit 611 via the communication I/F 623 if an abnormality of the second portion 65*c* is detected. For example, the first control unit 611 or the second control unit 621 may output the request signal except when an abnormality is detected. The request signal may be output from the second control unit 621 to the first control unit 611 or from the first control unit 611 to the second control unit 621, for example, through an operation performed by a worker who maintains the vehicle C.

An example of how the first control unit 611 and the second control unit 621 detect an abnormality in the communication lines including the first wirings 65, the transmission/reception units 64, the second wirings 66, and the communication lines 7 will be described below. In the present embodiment, two communication lines, namely a communication line connecting one of the individual ECUs 2 to the first processing unit 61 and the second processing unit 62 and a communication line connecting the other individual ECU 2 to the first processing unit 61 and the second processing unit 62 are provided. Note that the communication line may include the connector 1.

Each communication line is branched. The communication lines each include a common communication line connected to the individual ECU 2, a first communication line connecting the common communication line and the first processing unit 61, and a second communication line connecting the common communication line and the second processing unit 62. In this embodiment, the common communication line includes the branch portion 65*d* and the common portion 65*a* of the first wiring 65, the transmission/reception unit 64, the second wiring 66, and the communication line 7. The first communication line also includes the first portion 65*b* of the first wiring 65. The second communication line also includes the second portion 65*c* of the first wiring 65.

The message output from the individual ECU 2 is input to both the first communication unit 614 of the first processing unit 61 and the second communication unit 624 of the second processing unit 62 as described above. When a message is input to the first communication unit 614, the determination circuit 614a of the first communication unit 614 outputs, to the first control unit 611, a signal indicating input of the message. When a message is input to the second communication unit 624, the determination circuit 624a of the second communication unit 624 outputs, to the second control unit 621, a signal indicating input of the message.

For example, a signal indicating input of a message output from one of the individual ECUs 2 is different from a signal indicating input of a message output from the other individual ECU 2. For example, the message ID and the information of the individual ECU 2 that outputs the message, such as the ID number of the individual ECU 2, are stored in association with each other in the determination circuit 614a and the determination circuit 624a. The determination circuit 614a and the determination circuit 624a output a signal indicating input of the message output from one of the individual ECUs 2 or a signal indication input of the message output from the other individual ECU 2 based on the stored message ID and the information of the individual ECU 2 that outputs the message.

A case will be described in which the first control unit 611 and the second control unit 621 detect an abnormality in the communication line connecting one of the individual ECUs 2 to the first processing unit 61 and the second processing unit 62. The first control unit 611 and the second control unit 621 communicate, for example, periodically via the communication I/F 613 and the communication I/F 623 to notify each other of the message input status. Specifically, the first control unit 611 notifies the second control unit 621 of the message input status in the first communication unit 614. The second control unit 621 notifies the first control unit 611 of the message input status in the second communication unit 624. The message input status in the first communication unit 614 corresponds to the input status of the message in the first processing unit 61. The message input status in the second communication unit 624 corresponds to the message input status in the second processing unit 62.

The first control unit 611 and the second control unit 621 check the input status of the message in the first communication unit 614 and the second communication unit 624, and detect an abnormality based on the message input status. If the message output from one of the individual ECUs 2 is input to both the first communication unit 614 and the second communication unit 624, the first control unit 611 and the second control unit 621 determine that there is no abnormality in the communication line. The abnormality in the communication line includes disconnection of the first wiring 65, an abnormality such as poor contact in the transmission/reception unit 64, disconnection of the second wiring 66, and disconnection of the communication line 7. Note that one of the first control unit 611 and the second control unit 621 may also determine that there is no abnormality in the communication line.

If a message output from one of the individual ECUs 2 is input only to the first communication unit 614 out of the first communication unit 614 and the second communication unit 624, the first control unit 611 and the second control unit 621 perform the following processing. The first control unit 611 determines that there is no abnormality in the first portion 65b of the first wiring 65. Also, the first control unit 611 determines that there is no abnormality in the branch portion 65d and the common portion 65a of the first wiring 65, the transmission/reception unit 64, the second wiring 66, and the communication line 7. That is, the first control unit 611 determines that there is no abnormality in the first communication line and the common communication line. The second control unit 621 determines that there is an abnormality such as disconnection in the second portion 65c of the first wiring 65. That is, the second control unit 621 determines that there is an abnormality in the second communication line. In this case, the second communication line corresponds to part of the wiring. The integrated ECU 6 can detect an abnormality in communication between the second processing unit 62 and one of the individual ECUs 2. The second control unit 621 outputs a request signal to the first control unit 611 via the communication I/F 623 if it is determined that there is an abnormality in the second communication line. The second control unit 621 may also transmit the fact that there is an abnormality in the second communication line to an external server (not shown) that is provided outside of the vehicle C and is capable of communicating with the integrated ECU 6. In addition, the second control unit 621 may use a communication device (not shown) to transmit the fact that there is an abnormality in the second communication line to a terminal such as a smartphone possessed by the driver of the vehicle C. Note that the first control unit 611 may also determine that there is an abnormality in the second communication line. The second control unit 621 may also determine that there is no abnormality in the first communication line and the common communication line.

If a message output from one individual ECU 2 is input only to the second communication unit 624 out of the first communication unit 614 and the second communication unit 624, the first control unit 611 and the second control unit 621 perform the following processing. The first control unit 611 determines that there is an abnormality in the first communication line. If it is determined that there is an abnormality in the first communication line, the first control unit 611 outputs a request signal to the second control unit 621 via the communication I/F 613. In this case, the first communication line corresponds to part of the wiring. The second control unit 621 determines that there is no abnormality in the second communication line and the common communication line. The integrated ECU 6 can detect an abnormality in communication between the first processing unit 61 and one of the individual ECUs 2. The first control unit 611 may also transmit the fact that there is an abnormality in the first communication line to an external server (not shown) or a terminal possessed by the driver. Note that the second control unit 621 may also determine that there is an abnormality in the first portion 65b. The first control unit 611 may also determine that there is no abnormality in the second communication line and the common communication line.

If a message output from one of the individual ECUs 2 is input to neither the first communication unit 614 nor the second communication unit 624, the first control unit 611 and the second control unit 621 perform the following processing. Since there is a low likelihood that an abnormality occurs in both the first communication line and the second communication line, the first control unit 611 and the second control unit 621 determine that there is an abnormality in the common communication line. The first control unit 611 and the second control unit 621 may also determine that there is no abnormality in the first communication line and the second communication line. In this case, the common communication line corresponds to part of the wiring. The integrated ECU 6 can detect an abnormality in communication between the first processing unit 61 and second processing unit 62 and one of the individual ECUs 2. The first control unit 611 or the second control unit 621 may also transmit the fact that there is an abnormality in the common communication line to an external server (not shown) or a terminal possessed by the driver. Note that one of the first control unit 611 and the second control unit 621 may also determine that there is an abnormality in the common communication line.

If the message output from one of the individual ECUs 2 is input to neither the first communication unit 614 nor the second communication unit 624, the first control unit 611 and the second control unit 621 may also determine whether or not communication via the first wiring 65 connected to the one individual ECU 2 is successful. For example, the first control unit 611 outputs any message for abnormality detection to the second processing unit 62 via the first portion 65*b* and the second portion 65*c* of the first wiring 65 connected to the one individual ECU 2.

If the message output from the first control unit 611 is input to the second processing unit 62, that is, if the communication via the first wiring 65 is successful, the second control unit 621 acquires a signal indicating input of the message from the determination circuit 624*a*. The second control unit 621 outputs a signal indicating that the message has been input, to the first control unit 611 via the communication I/F 613. The first control unit 611 acquires the above-described signal output from the second control unit 621. The first control unit 611 and the second control unit 621 determine that there is no abnormality in the first communication line and the second communication line. Also, the first control unit 611 and the second control unit 621 determine that there is an abnormality in the common communication line. For example, the second control unit 621 may also output a message for abnormality detection to the first processing unit 61 via the first portion 65*b* and the second portion 65*c* of the first wiring 65 connected to the one individual ECU 2.

If the message output from one of the individual ECUs 2 is input to neither the first communication unit 614 nor the second communication unit 624, the first control unit 611 and the second control unit 621 may also perform the following processing. The first control unit 611 and the second control unit 621 determine whether or not the amount of time during which the message output from the one individual ECU 2 is input to neither the first communication unit 614 nor the second communication unit 624 is greater than or equal to a predetermined amount of time. If the above-described amount of time is greater than or equal to the predetermined amount of time, the first control unit 611 and the second control unit 621 determine that there is an abnormality in the common communication line.

Note that the first control unit 611 may also check the input status of the message in the first communication unit 614 and the second communication unit 624 if the signal indicating input of the message is obtained from the determination circuit 614*a*. The second control unit 621 may also check the input status of the message in the first communication unit 614 and the second communication unit 624 if the signal indicating input of the message is obtained from the determination circuit 624*a*.

The first control unit 611 and the second control unit 621 similarly detect an abnormality in the communication line connecting the other individual ECU 2 to the first processing unit 61 and second processing unit 62.

Figure 11:
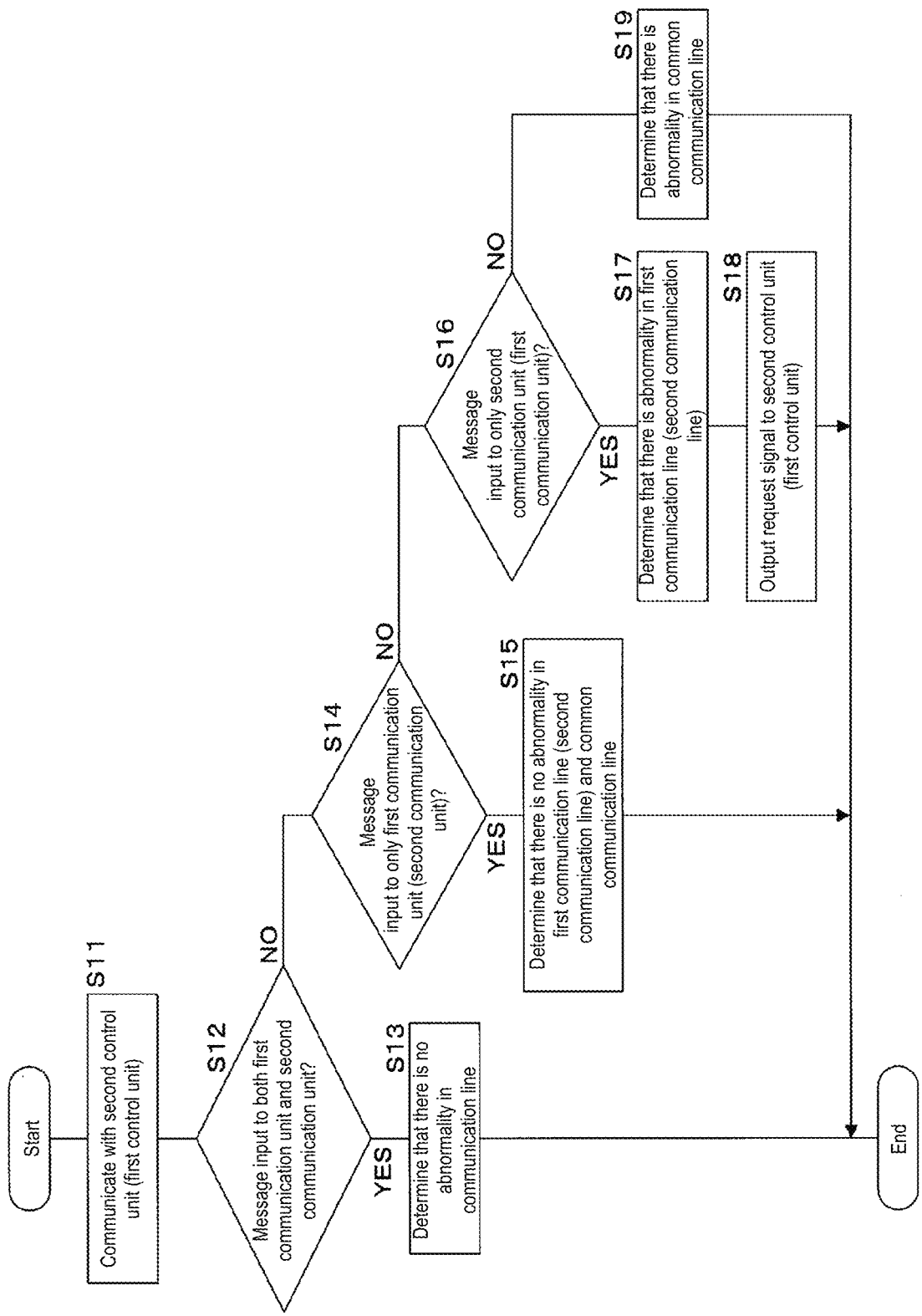
FIG. 11 is a flowchart illustrating processing related to communication line abnormality detection performed by a first control unit.

FIG. 11 is a flowchart showing an example of processing related to communication line abnormality detection performed by the first control unit 611. For example, when the IG (ignition) switch is turned on from off, the first control unit 611 performs the following processing. Hereinafter, steps are abbreviated as "S".

The first control unit 611 communicates with the second control unit 621 via the communication I/F 613 and the communication I/F 623 (S11). Specifically, the first control unit 611 notifies the second control unit 621 of the message input status in the first communication unit 614. Also, the first control unit 611 acquires the message input status in the second communication unit 624 notified from the second control unit 621. The first control unit 611 determines whether or not a message output by any individual ECU 2 as described above has been input to both the first communication unit 614 and the second communication unit 624 (S12).

If the above-described message has been input to both the first communication unit 614 and the second communication unit 624 (S12: YES), the first control unit 611 determines that there is no abnormality in the communication line (S13), and ends processing. The first control unit 611 may also perform the processing of S11 instead of ending the processing.

If the above-described message has not been input to both the first communication unit 614 and the second communication unit 624 (S12: NO), the first control unit 611 determines whether or not the above-described message has been input to only the first communication unit 614 out of the first communication unit 614 and the second communication unit 624 (S14). If the above-described message has been input to only the first communication unit 614 (S14: YES), the first control unit 611 determines that there is no abnormality in the first communication line and the common communication line (S15), and ends the processing. The first control unit 611 may also perform the processing of S11 instead of ending the processing.

If the above-described message has not been input to only the first communication unit 614 (S14: NO), the first control unit 611 determines whether or not the above-described message has been input to only the second communication unit 624 out of the first communication unit 614 and the second communication unit 624 (S16). If the above-described message has been input to only the second communication unit 624 (S16: YES), the first control unit 611 determines that there is an abnormality in the first communication line (S17), and outputs a request signal to the second control unit 621 (S18). For example, the first control unit 611 stops acquiring messages from the first communication unit 614. The first control unit 611 ends the processing.

If the above-described message has not been input to only the second communication unit 624 (S16: NO), that is, if the above-described message has been input to neither the first communication unit 614 nor the second communication unit 624, the first control unit 611 determines that there is an abnormality in the common communication line (S19). When it is determined that there is an abnormality in the common communication line, the first control unit 611 may also output the fact that there is an abnormality in the common line to an external server (not shown) or a portable terminal such as a smartphone possessed by the driver. The first control unit 611 ends the processing.

The flowchart of the processing related to the abnormality detection of the communication line performed by the second control unit 621 is obtained by replacing the terms the above-described flowchart of the processing related to the abnormality detection of the first control unit 611 as follows, and therefore detailed description of the processing related to communication line abnormality detection performed by the second control unit 621 will be omitted. The first control unit 611, the first communication unit 614, and the first communication line in the flowchart of the processing related to the abnormality detection of the first control unit 611 are respectively replaced with the second control unit 621, the second communication unit 624, and the second communication line in the flowchart of the processing related to the abnormality detection of the second control unit 621. The second control unit 621 and the second communication unit 624 in the flowchart of the processing related to the abnormality detection of the first control unit 611 are respectively replaced with the first control unit 611 and the first communication unit 614 in the flowchart of the processing related to the abnormality detection of the second control unit 621. In FIG. 11, the second control unit 621, the second communication unit 624, the second communication line, the first control unit 611, and the first communication unit 614 serving as replacements are shown in parentheses.

Figure 12:
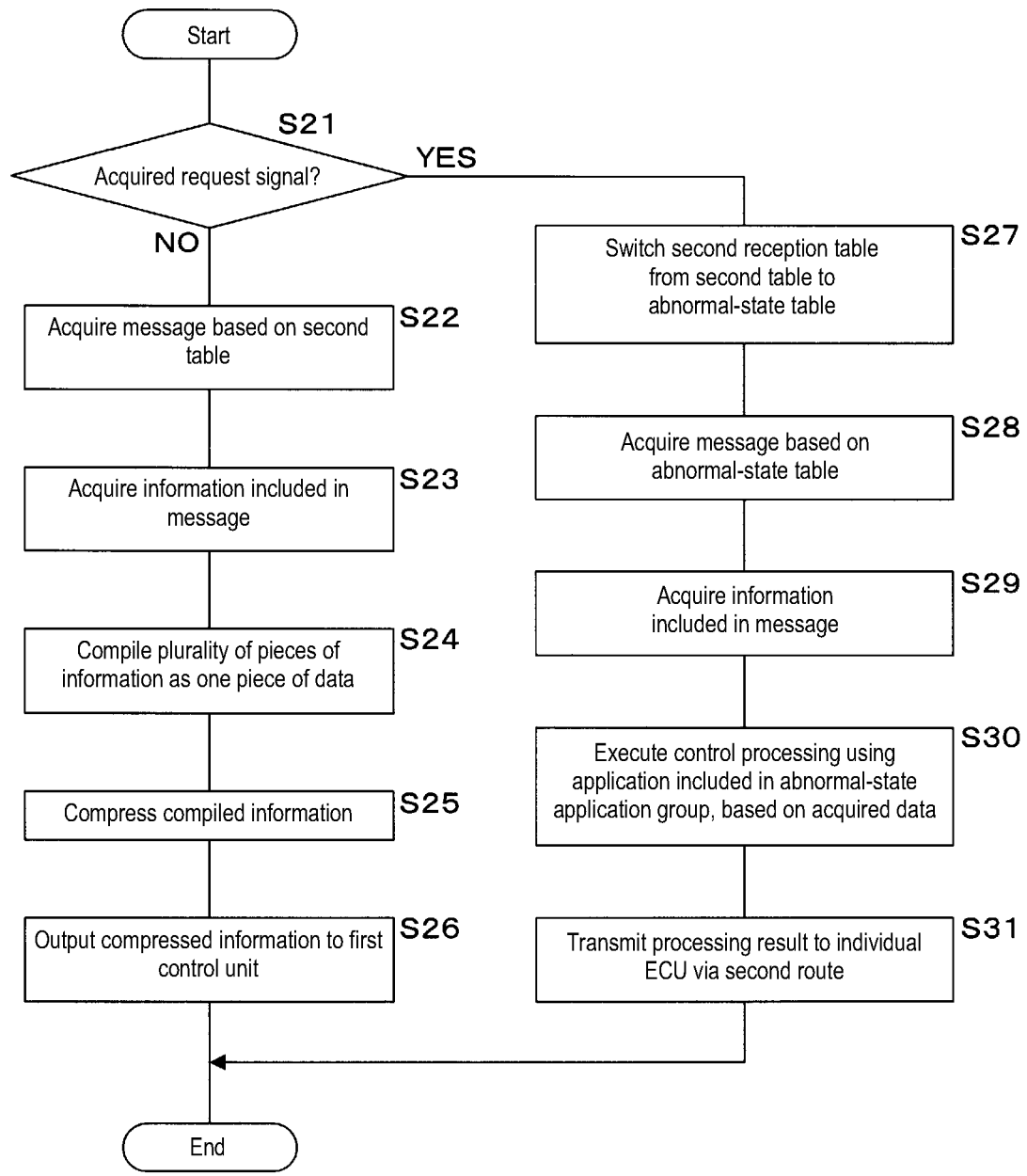
FIG. 12 is a flow chart illustrating processing related to control processing performed by a second control unit.

FIG. 12 is a flowchart illustrating processing related to control processing performed by the second control unit 621. For example, when the IG switch is turned on from off, the second control unit 621 performs the following processing.

The second control unit 621 determines whether or not the request signal output from the first control unit 611 has been acquired (S21). If the request signal has not been acquired (S21: NO), the second control unit 621 acquires a message based on the second table T21 from the second communication unit 624 (S22). That is, the second control unit 621 acquires the reception target message of the second processing unit 62 from the second communication unit 624. The second control unit 621 acquires information included in the acquired message (S23). For example, the second control unit 621 extracts the detection value of the sensor 5 included in the acquired message.

The second control unit 621 repeats acquisition of a message based on the second table T21 and acquisition of information included in the message, and acquires a plurality of pieces of information. The second control unit 621 compiles the acquired plural pieces of information into one piece of data (S24), and compresses the compiled information (S25). The second control unit 621 outputs the above-described compressed information to the first control unit 611 (S26). The second control unit 621 ends the processing. The second control unit 621 may also perform the processing of S21 instead of ending the processing.

The second control unit 621 may also output a plurality of pieces of information to the first control unit 611 without grouping them as one piece of data, or may output the information to the first control unit 611 without compressing the information. For example, every time the above-described information is acquired, the second control unit 621 may compress the information or output it to the first control unit 611 without compression. For example, the second control unit 621 may output the compiled information to the first control unit 611 without compression.

Note that as described above, when a predetermined message among the reception target messages for the second processing unit 62 is received, the second control unit 621 uses an application included in the second application group A2 to perform control processing based on information that is based on the predetermined message. The second control unit 621 transmits a message including the processing result of the control processing to the individual ECU 2.

If a request signal is acquired (S21: YES), the second control unit 621 switches the second reception table T2 referred to by the determination circuit 624a from the second table T21 to the abnormal-state table T22 (S27). The second control unit 621 acquires a message based on the abnormal-state table from the second communication unit 624 (S28). That is, the second control unit 621 acquires the reception target message of the first processing unit 61 and the reception target message of the second processing unit 62.

The second control unit 621 acquires information included in the acquired message (S29). Based on the acquired information, the second control unit 621 executes control processing using the applications included in the abnormal-state application group A3 (S30). The second control unit 621 transmits the processing result of the executed control processing to the individual ECU 2 via the second route (S31). Specifically, the second control unit 621 transmits a frame including the above-described processing result to the individual ECU 2 via the second route. The second control unit 621 ends the processing. The second control unit 621 may also perform the processing of S28 instead of ending the processing.

Figure 13:
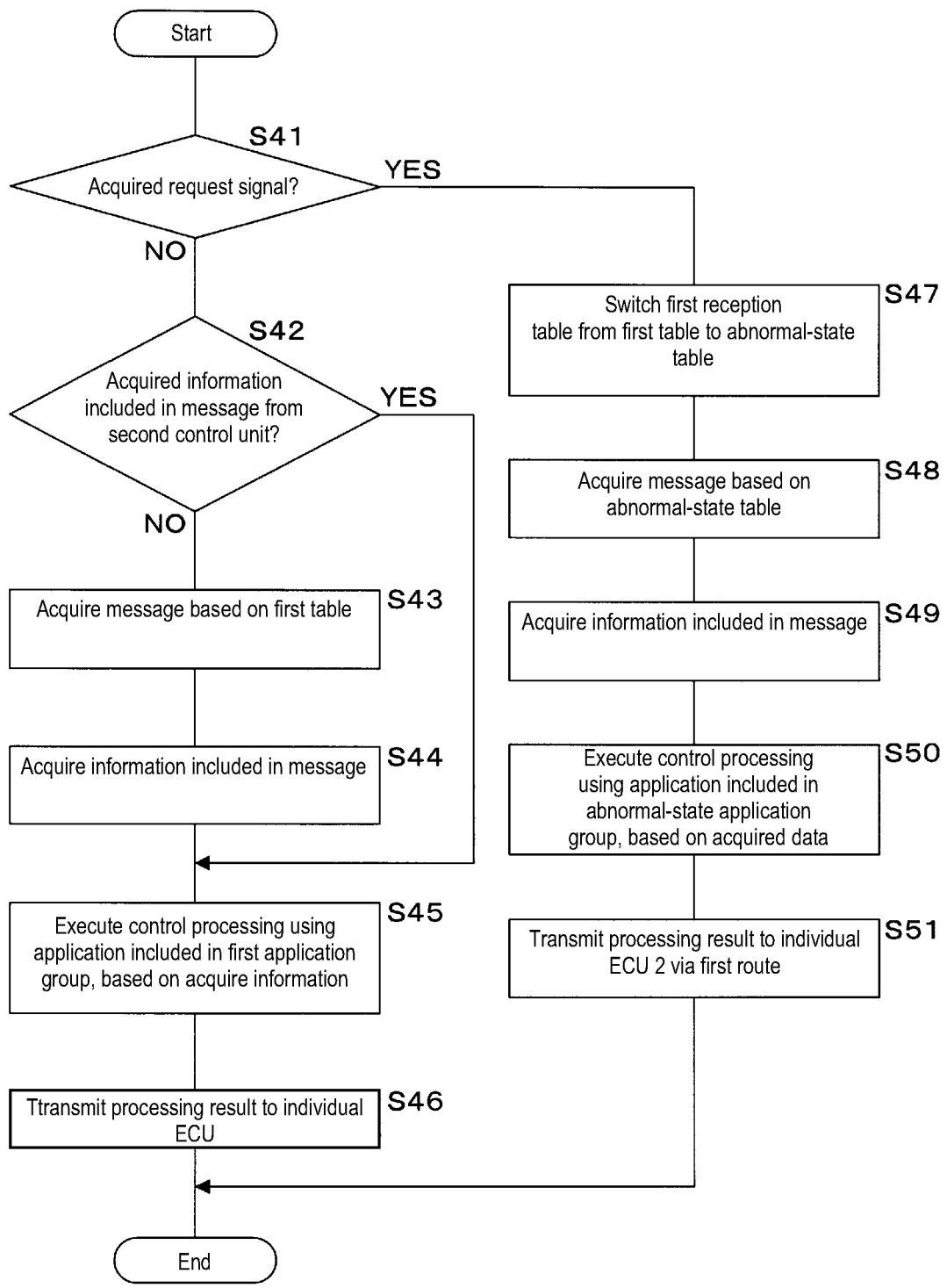
FIG. 13 is a flow chart illustrating processing related to control processing performed by the first control unit.

FIG. 13 is a flowchart illustrating processing related to control processing performed by the first control unit 611. For example, when the IG switch is turned on from off, the first control unit 611 performs the following processing.

The first control unit 611 determines whether or not the request signal output from the second control unit 621 has been acquired (S41). If the request signal has not been acquired (S41: NO), the first control unit 611 determines whether or not the information included in the reception target message of the second processing unit 62 has been acquired from the second control unit 621 (S42).

If the above-described information has not been acquired from the second control unit 621 (S42: NO), the first control unit 611 acquires a message based on the first table T11 from the first communication unit 614 (S43). That is, the first control unit 611 acquires the reception target message of the first processing unit 61 from the first communication unit 614.

As described above, the first control unit 611 acquires the information included in the acquired message (S44). For example, the first control unit 611 retrieves the value of the sensor 5 included in the acquired message. Based on the acquired information, the first control unit 611 executes control processing using the applications included in the first application group A1 (S45).

The first control unit 611 transmits the processing result of the control processing to the individual ECU 2 (S46), and ends the processing. For example, based on the transmission table described above, the first control unit 611 transmits a message including the processing result to the individual ECU 2 via the first route or transmits the message to the individual ECU 2 via the second processing unit 62 and the second route. The first control unit 611 may also perform the processing of S41 instead of ending the processing.

If the information included in the reception target message of the second processing unit 62 has been acquired from the second control unit 621 (S42: YES), the first control unit 611 performs the processing of S45. For example, the first control unit 611 acquires a plurality of pieces of information that have been compiled and compressed as one piece of data as described above. The first control unit 611 decompresses the above-described information that has been compiled and compressed as one piece of data. The first control unit 611 acquires the decompressed information. Based on the acquired information, the first control unit 611 executes control processing using the applications included in the first application group A1. The first control unit 611 performs the processing of S46 and ends the processing. The first control unit 611 may also perform the processing of S41 instead of ending the processing.

Based on the information included in the message obtained from the first communication unit 614 and the information obtained from the second control unit 621, the first control unit 611 may execute control processing using the applications included in the first application group A1. For example, the first control unit 611 transmits the processing result of the control processing to the individual ECU 2 based on the transmission table.

If the request signal has been acquired (S41: YES), the first control unit 611 switches the first reception table T1 referred to by the determination circuit 614a from the first table T11 to the abnormal-state table T12 (S47). The first control unit 611 acquires a message based on the abnormal-state table T12 from the first communication unit 614 (S48). That is, the first control unit 611 acquires the reception target message of the first processing unit 61 and the reception target message of the second processing unit 62.

The first control unit 611 acquires information included in the acquired message (S49). Based on the acquired information, the first control unit 611 executes control processing using the applications included in the abnormal-state application group A3 (S50). The first control unit 611 transmits the processing result of the executed control processing to the individual ECU 2 via the first route (S51). Specifically, the first control unit 611 transmits a frame including the above-described processing result to the individual ECU 2 via the first route. The first control unit 611 ends the processing. The first control unit 611 may also perform the processing of S48 instead of ending the processing.

In the present embodiment, messages output from the individual ECU 2 are respectively input to the first communication unit 614 and the second processing unit 62 of the first processing unit 61. Based on the second table T21, the second processing unit 62 receives the reception target message of the second processing unit 62 among the input messages, and acquires the information included in the message. The second processing unit outputs the acquired information to the first processing unit. The first processing unit 61 acquires information output from the second processing unit 62, and performs control processing based on the acquired information. Also, the first processing unit 61 receives reception target messages for the first processing unit 61 among the input messages, based on the first reception table T1. The first processing unit acquires information included in the received message and performs control processing based on the acquired information. A message output from the individual ECU 2 is distributed to the first processing unit 61 and the second processing unit 62 and received. The load on the second processing unit 62 when acquiring information included in the reception target message of the second processing unit 62 is small. Since the information included in the message received by the second processing unit 62 is output to the first processing unit 61, the first processing unit 61 does not need to retrieve the information included in the reception target message of the second processing unit 62 from the message. The load on the first processing unit 61 can be reduced compared to the case where the first processing unit 61 retrieves the information included in the reception target message of the second processing unit 62 from the message. The integrated ECU 6 can efficiently perform control processing due to the first processing unit 61 and the second processing unit 62 performing processing in cooperation with each other.

Based on the acquired information, the second processing unit 62 performs control processing using the applications in the second application group A2. Since the integrated ECU 6 can perform the control processing with the first processing unit 61 and the second processing unit 62 in a distributed manner, the control processing can be performed more efficiently.

The second processing unit 62 compresses the information included in the received message and outputs the compressed information to the first processing unit 61. The second processing unit 62 can efficiently output the information included in the received message to the first processing unit 61. The second processing unit 62 acquires a plurality of pieces of information included in the received message, and collectively outputs the acquired pieces of information to the first processing unit 61. Since the frequency of communication between the first processing unit 61 and the second processing unit 62 can be reduced, the load on the first processing unit 61 and the second processing unit 62 can be reduced.

The first processing unit 61 receives a message output irregularly, which is a so-called event message, and performs control processing based on information that is based on the message. Control processing based on messages that are output irregularly need to be performed quickly. If the control processing is performed based on the information included in the message received by the first processing unit 61, the time from when the message is output from the individual ECU 2 to when the control processing ends is shorter compared to the case where the first processing unit 61 acquires information included in the message from the second processing unit 62. Since the first processing unit 61 receives a message that is output irregularly, the integrated ECU 6 can quickly perform control processing when a message that is output irregularly is output.

The first processing unit 61 receives a message including inter-vehicle data or driving force data among the messages related to the advanced driving support system, and performs control processing. Since the first processing unit 61 can quickly perform control processing based on the above-described message, the driving of the vehicle C can be controlled appropriately. Since the first processing unit 61 acquires the information included in the message including the meter notification data from the second processing unit 62, an increase in the processing load on the first processing unit 61 can be suppressed.

The first processing unit 61 transmits a message including the processing result of the control processing to the individual ECU 2 through the second processing unit 62 or not through the second processing unit 62, according to the type of the message. The first processing unit 61 can transmit the message to the individual ECU 2 quickly by transmitting the message including the processing result requiring high responsiveness to the individual ECU 2 without going through the second processing unit 62. Since the integrated ECU 6 uses two routes for message transmission, the message can be efficiently transmitted to the individual ECU 2.

In response to a request from the second processing unit 62, the first processing unit 61 receives a reception target message of the first processing unit 61 and a reception target message of the second processing unit 62, and performs control processing. Even if the second processing unit 62 cannot receive the message, the first processing unit 61 can perform control processing. In response to a request from the first processing unit 61, the second processing unit 62 receives a reception target message of the first processing unit 61 and a reception target message of the second processing unit 62, and performs control processing. Even if the first processing unit 61 cannot execute the control processing, the integrated ECU 6 can cause the second processing unit 62 to execute the control processing.

Since the integrated ECU 6 detects an abnormality in the communication line, it is possible to detect an abnormality in communication between the integrated ECU 6 and the individual ECUs 2. If an abnormality is detected in communication between the first processing unit 61 and the individual ECU 2, the integrated ECU 6 causes the second processing unit 62 out of the first processing unit 61 and the second processing unit 62 to receive the message and perform control processing. If an abnormality is detected in communication between the first processing unit 61 and the individual ECU 2, the integrated ECU 6 causes the first processing unit 61 out of the first processing unit 61 and the second processing unit 62 to receive a message and perform control processing. Even if an abnormality occurs in the communication between one of the first processing unit 61 and the second processing unit 62 and the individual ECU 2, the integrated ECU 6 can receive the reception target message of the first processing unit 61 and the reception target message of the second processing unit 62 and perform control processing.

Note that the integrated ECU 6 may also be configured such that the second processing unit 62 does not perform the control processing using the applications of the second application group A2 if no abnormality is detected. In this case, the applications of the second application group A2 are included in the first application group A1.

The integrated ECU 6 may also be provided with three or more processing units constituted by individual processors. For example, the integrated ECU 6 may also include a first processing unit 61, a second processing unit 62, and a third processing unit, which are individual processors.

Second Embodiment

Figure 14:
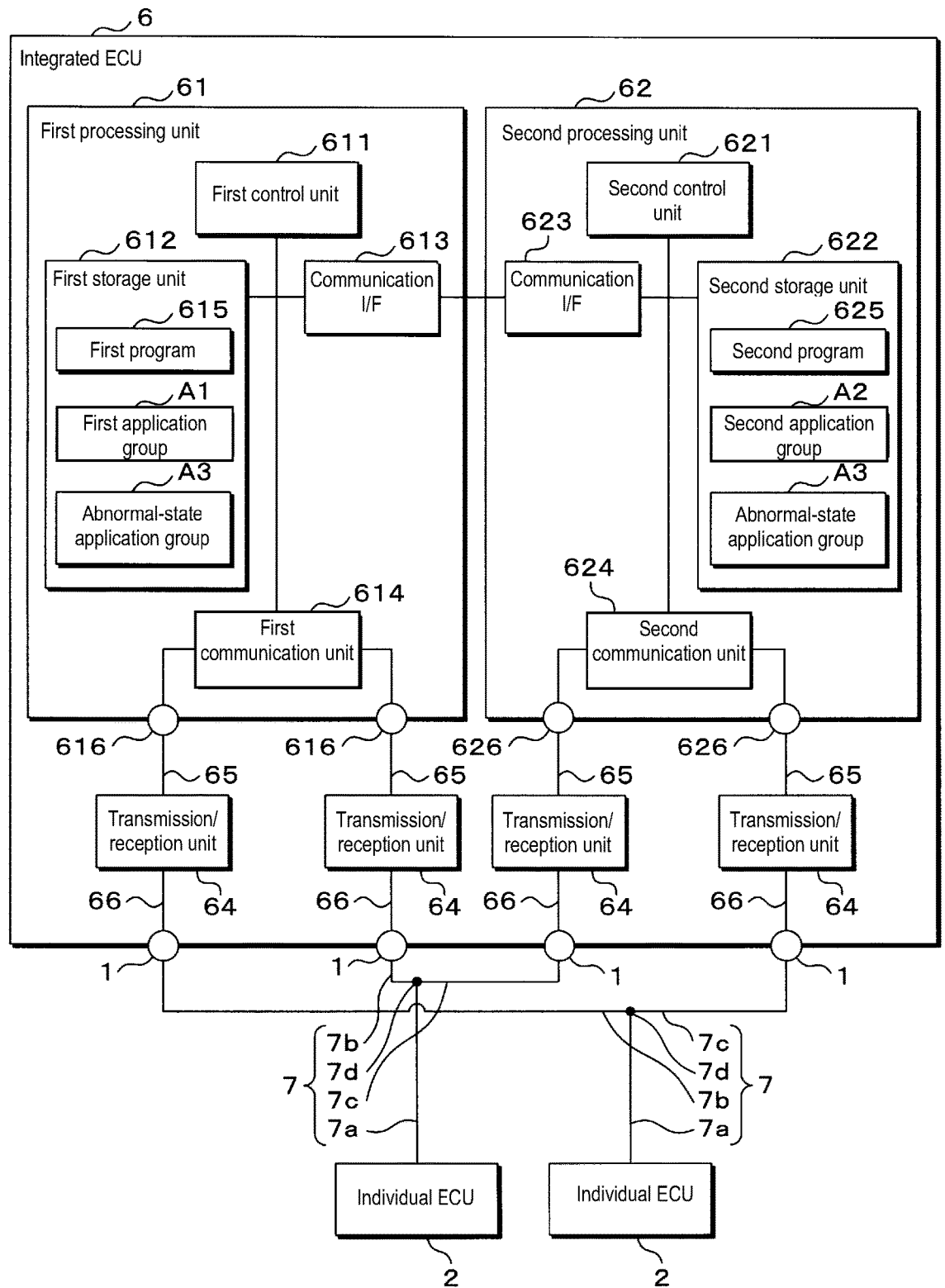
FIG. 14 is a block diagram illustrating a configuration of an integrated ECU according to a second embodiment.

FIG. 14 is a block diagram illustrating a configuration of an integrated ECU 6 according to a second embodiment. In the configuration according to the second embodiment, the same components as those in the first embodiment are denoted by the same reference numerals, and detailed description thereof is omitted. The integrated ECU 6 includes a first processing unit 61, a second processing unit 62, and a plurality of transmission/reception units 64. The first processing unit 61 has two connection portions 616. The second processing unit 62 has two connection portions 626.

The integrated ECU 6 of FIG. 14 is provided with four transmission/reception units 64. Two of the four transmission/reception units 64 are connected to the first processing unit 61 via different first wirings 65. Hereinafter, the transmission/reception units 64 connected to the first processing unit 61 are also referred to as the transmission/reception units 64 on the first processing unit 61 side. The first wiring 65 connected to one of the transmission/reception units 64 on the first processing unit 61 side is connected to one of the connection portions 616. The first wiring 65 connected to the other transmission/reception unit 64 on the first processing unit 61 side is connected to the other connection portion 616.

The remaining two transmission/reception units 64 among the four transmission/reception units 64 are connected to the second processing unit 62 via different first wirings 65. Hereinafter, the transmission/reception units 64 connected to the second processing unit 62 are also referred to as the transmission/reception units 64 on the second processing unit 62 side. The first wiring 65 connected to one of the transmission/reception units 64 on the second processing unit 62 side is connected to one of the connection portions 626. The first wiring 65 connected to the other transmission/reception unit 64 on the second processing unit 62 side is connected to the other connection portion 626.

The integrated ECU 6 has a connector 1 corresponding to each transmission/reception unit 64. Specifically, the integrated ECU 6 has the same number of connectors 1 as the number of transmission/reception units 64. One of the transmission/reception units 64 on the first processing unit 61 side and a first connector 1 are connected to each other by a second wiring 66. The other transmission/reception unit 64 on the first processing unit 61 side and a second connector 1 are connected to each other by a second wiring 66. One of the transmission/reception units 64 on the second processing unit 62 side and a third connector 1 are connected to each other by a second wiring 66. The other transmission/reception unit 64 on the second processing unit 62 side and a fourth connector 1 are connected to each other by a second wiring 66.

The integrated ECU 6 is connected to two individual ECUs 2. Specifically, one of the individual ECUs 2 is connected to one of the connectors 1 connected to the transmission/reception units 64 on the first processing unit 61 side and one of the connectors 1 connected to the transmission/reception units 64 on the second processing unit 62 side by the communication line 7. The other individual ECU 2 is connected to the other connector 1 connected to the transmission/reception unit 64 on the first processing unit 61 side and the other connector 1 connected to the transmission/reception unit 64 on the second processing unit 62 side by the communication line 7. The communication line 7 connected to one individual ECU 2 and the communication line 7 connected to the other individual ECU 2 are different from each other.

The communication lines 7 are branched. Each communication line 7 includes a branch portion 7d and a common portion 7a between the branch portion 7d and the individual ECU 2. Each communication line 7 also includes a first portion 7b between the branch portion 7d and the connector 1 connected to the transmission/reception unit 64 on the first processing portion 61 side. Each communication line 7 also includes a second portion 7c between the branch portion 7d and the connector 1 connected to the transmission/reception unit 64 on the second processing portion 62 side.

The first processing unit 61 and the second processing unit 62 communicate with the individual ECUs 2 via the first wirings 65, the transmission/reception units 64, the second wirings 66, and the communication lines 7. A message output by the individual ECU 2 is input to the first communication unit 614 of the first processing unit 61 and the second communication unit 624 of the second processing unit 62. Specifically, the above-described message is input to the first communication portion 614 via the common portion 7a and the first portion 7b of the communication line 7, the second wiring 66, the transmission/reception unit 64, and the first wiring 65. A route passing through the common portion 7a and the first portion 7b of the communication line 7, the second wiring 66, the transmission/reception unit 64, and the first wiring 65 is the first route of the second embodiment. The above-described message is input to the second communication unit 624 via the common portion 7a and the second portion 7c of the communication line 7, the second wiring 66, the transmission/reception unit 64, and the first wiring 65. A route passing through the common portion 7a and the second portion 7c of the communication line 7, the second wiring 66, the transmission/reception unit 64, and the first wiring 65 is the second route of the second embodiment.

As in the first embodiment, the second control unit 621 of the second processing unit 62 acquires, from the second communication unit 624, the reception target message of the second processing unit. The second processing unit 62 outputs information included in the received message to the first control unit 611 of the first processing unit 61. Also, the second control unit performs control processing using the applications of the second application group A2 based on the information included in the acquired message. The second control unit 621 transmits a message including the processing result of the control processing to the individual ECU 2 via the second route.

As in the first embodiment, the first control unit 611 acquires a reception target message of the first processing unit 61 from the first communication unit 614. Also, the first control unit 611 acquires information included in the reception target message of the second processing unit 62 from the second control unit 621. Based on at least one of the information included in the acquired message and the information acquired from the second control unit 621, the first control unit 611 performs control processing using the applications of the first application group A1. The first control unit 611 transmits a message including the processing result of the control processing to the individual ECU 2 via the first route. Alternatively, the first control unit 611 transmits a message including the processing result to the individual ECU 2 via the second processing unit 62 and the second route.

As in the first embodiment, the first control unit 611 and the second control unit 621 detect an abnormality in the communication line including the first wiring 65, the transmission/reception unit 64, the second wiring 66, and the communication line 7. In the present embodiment, two communication lines, namely a communication line connecting one individual ECU 2 to the first processing unit 61 and the second processing unit 62 and a communication line connecting another individual ECU 2 to the first processing unit 61 and the second processing unit 62 are provided.

The communication lines include a common communication line, a first communication line, and a second communication line. The common communication line of the second embodiment includes the common portion 7a of the communication line 7. The first communication line of the second embodiment includes the first wiring 65, the transmission/reception unit 64, and the second wiring 66 connected to the first processing unit 61, and the first portion 7b of the communication line 7. The second communication line of the second embodiment includes the first wiring 65, the transmission/reception unit 64, and the second wiring 66 connected to the second processing unit 62, and the second portion 7c of the communication line 7.

As in the first embodiment, the first control unit 611 and the second control unit 621 check the message input status in the first communication unit 614 and the second communication unit 624 when an abnormality is detected. At least one of the first control unit 611 and the second control unit 621 detects an abnormality in the common communication line, the first communication line, or the second communication line according to the message input status, as in the first embodiment. If an abnormality is detected, at least one of the first control unit 611 and the second control unit 621 may transmit the fact that there is an abnormality to an external server (not shown) or a terminal possessed by the driver.

For example, if an abnormality in the second communication line is detected, the first control unit 611 acquires a request signal output from the second control unit 621. If the request signal is acquired, the first control unit 611 receives the reception target message of the first processing unit 61 and the reception target message of the second processing unit 62 from the first communication unit 614 in the same manner as in the first embodiment, and performs control processing. For example, if an abnormality in the first communication line is detected, the second control unit 621 acquires a request signal output from the first control unit 611. If the request signal is acquired, the second control unit 621 receives the reception target message of the first processing unit 61 and the reception target message of the second processing unit 62 from the second communication unit 624 in the same manner as in the first embodiment and performs control processing.

In this embodiment, the first processing unit 61 and the second processing unit 62 are connected to each individual ECU 2 via different transmission/reception units 64. The integrated ECU 6 can communicate with each individual ECU 2 even if there is an abnormality in one of the transmission/reception units 64. Note that the number of individual ECUs 2 is not limited to two. The number of transmission/reception units 64 is not limited to four.

Third Embodiment

Figure 15:
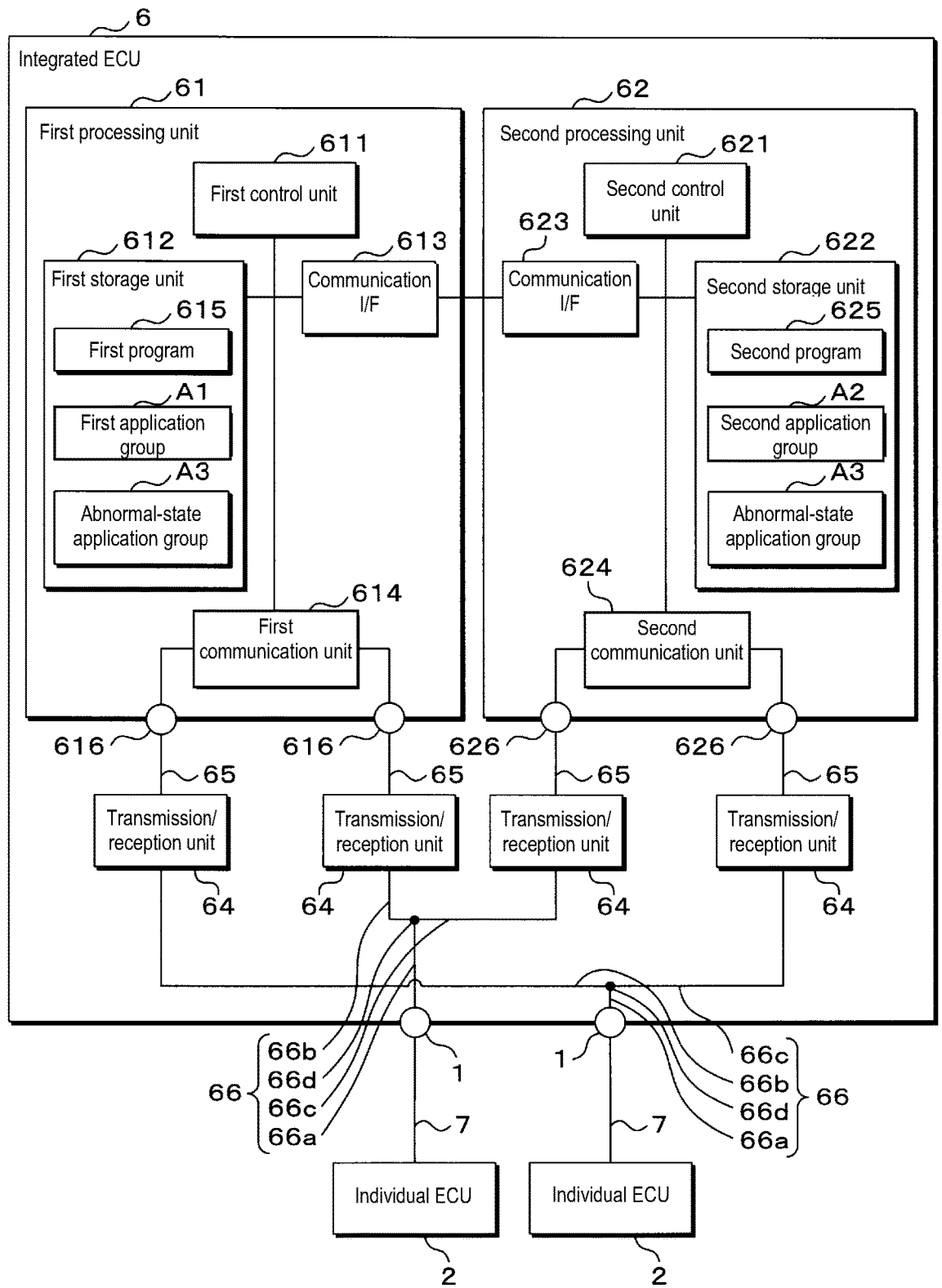
FIG. 15 is a block diagram illustrating a configuration of an integrated ECU according to a third embodiment.

FIG. 15 is a block diagram illustrating a configuration of an integrated ECU 6 according to a third embodiment. In the configuration according to the third embodiment, the same components as those in the second embodiment are denoted by the same reference numerals, and detailed description thereof will be omitted. The integrated ECU 6 of the third embodiment has four transmission/reception units 64. As in the second embodiment, two of the four transmission/reception units 64 are connected to the first processing unit 61 by first wirings 65. The remaining two transmission/reception units 64 among the four transmission/reception units 64 are connected to the second processing unit 62 by first wirings 65.

The integrated ECU 6 has two connectors 1. One of the connectors 1 is connected to one of the transmission/reception units 64 on the first processing unit 61 side and one of the transmission/reception units 64 on the second processing unit 62 side via a second wiring 66. The other connector 1 is connected to the other transmission/reception unit 64 on the first processing unit 61 side and the other transmission/reception unit 64 on the second processing unit 62 side via a second wiring 66. The second wiring 66 connected to the one connector 1 and the second wiring 66 connected to the other connector 1 are different from each other.

The second wiring 66 is branched. The second wiring 66 includes a branch portion 66d and a common portion 66a between the branch portion 66d and the connector 1. The second wiring 66 also includes a first portion 66b between the branch portion 66d and the transmission/reception unit 64 on the first processing portion 61 side. The second wiring 66 also includes a second portion 66c between the branch portion 66d and the transmission/reception unit 64 on the second processing portion 62 side.

One connector 1 is connected to one individual ECU 2 via a communication line 7. The other connector 1 is connected to the other individual ECU 2 via a communication line 7. The communication line 7 connected to the one individual ECU 2 and the communication line 7 connected to the other individual ECU 2 are different from each other.

The first processing unit 61 and the second processing unit 62 communicate with the individual ECUs 2 via the first wirings 65, the transmission/reception units 64, the second wirings 66, and the communication lines 7. A message output by the individual ECU 2 is input to the first communication unit 614 of the first processing unit 61 and the second communication unit 624 of the second processing unit 62. Specifically, the above-described message is input to the first communication unit 614 via the communication line 7, the common portion 66a and the first portion 66b of the second wiring 66, the transmission/reception unit 64, and the first wiring 65. A route through the communication line 7, the common portion 66a and the first portion 66b of the second wiring 66, the transmission/reception unit 64, and the first wiring 65 is the first route of the third embodiment. The above-described message is input to the second communication unit 624 via the communication line 7, the common portion 66a and the second portion 66c of the second wiring 66, the transmission/reception unit 64, and the first wiring 65. A route through the communication line 7, the common portion 66a and the second portion 66c of the second wiring 66, the transmission/reception unit 64, and the first wiring 65 is the second route of the third embodiment.

As in the first embodiment, the second control unit 621 of the second processing unit 62 acquires, from the second communication unit 624, the reception target message of the second processing unit. The second processing unit 62 outputs information included in the acquired message to the first processing unit 61. Also, the second control unit performs control processing using the applications of the second application group A2 based on the information included in the acquired message. The second control unit 621 transmits a message including the processing result of the control processing to the individual ECU 2 via the second route.

As in the first embodiment, the first control unit 611 of the first processing unit 61 acquires a reception target message of the first processing unit 61 from the first communication unit 614. Also, the first control unit 611 acquires information included in the reception target message of the second processing unit 62 from the second control unit 621. Based on at least one of the information included in the acquired message and the information acquired from the second control unit 621, the first control unit 611 performs control processing using the applications of the first application group A1. The first control unit 611 transmits a message including the processing result of the control processing to the individual ECU 2 via the first route. Alternatively, the first control unit 611 transmits a message including the processing result to the individual ECU 2 via the second processing unit 62 and the second route.

As in the first embodiment, the first control unit 611 and the second control unit 621 detect an abnormality in the communication line including the first wiring 65, the transmission/reception unit 64, the second wiring 66, and the communication line 7. In the present embodiment, two communication lines, namely a communication line connecting one individual ECU 2 to the first processing unit 61 and the second processing unit 62 and a communication line connecting another individual ECU 2 to the first processing unit 61 and the second processing unit 62, are provided.

The communication lines include a common communication line, a first communication line, and a second communication line. The common communication line of the third embodiment includes the common portion 66a of the second wiring 66 and the communication line 7. The first communication line of the third embodiment includes a first wiring 65 and a transmission/reception unit 64 connected to the first processing unit 61, and a first portion 66b of the second wiring 66. The second communication line of the third embodiment includes the first wiring 65 and the transmission/reception unit 64 connected to the second processing unit 62, and a second portion 66c of the second wiring 66.

As in the first embodiment, the first control unit 611 and the second control unit 621 check the message input status in the first communication unit 614 and the second communication unit 624 when an abnormality is detected. At least one of the first control unit 611 and the second control unit 621 detects an abnormality in the common communication line, the first communication line, or the second communication line according to the message input status, as in the first embodiment. If an abnormality is detected, at least one of the first control unit 611 and the second control unit 621 may transmit the fact that there is an abnormality to an external server (not shown) or a terminal possessed by the driver.

For example, if an abnormality in the second communication line is detected, the first control unit 611 acquires a request signal output from the second control unit 621. If the request signal is acquired, the first control unit 611 receives the reception target message of the first processing unit 61 and the reception target message of the second processing unit 62 from the first communication unit 614 in the same manner as in the first embodiment. and performs control processing. For example, if an abnormality in the first communication line is detected, the second control unit 621 acquires a request signal output from the first control unit 611. If the request signal is acquired, the second control unit 621 receives the reception target message of the first processing unit 61 and the reception target message of the second processing unit 62 from the second communication unit 624 in the same manner as in the first embodiment and performs control processing.

In this embodiment, the first processing unit 61 and the second processing unit 62 are connected to each individual ECU 2 via different transmission/reception units 64. The integrated ECU 6 can communicate with each individual ECU 2 even if there is an abnormality in one of the transmission/reception units 64. Since the second wiring 66 is branched, the number of connectors 1 can be reduced compared to the integrated ECU 6 of the second embodiment. Note that the number of individual ECUs 2 is not limited to two. The number of transmission/reception units 64 is not limited to four.

The embodiments disclosed herein are illustrative in all respects and should be considered non-limiting. The scope of the present disclosure is indicated not by the above-described meaning, but by the scope of the claims, and all changes within the scope and meaning equivalent to the scope of the claims are intended to be encompassed therein.

The invention claimed is:

1. An in-vehicle apparatus that is connected to a plurality of in-vehicle ECUs and is configured to transmit and receive messages to and from the plurality of in-vehicle ECUs, the in-vehicle apparatus comprising:
   a first processing unit that is configured to perform control processing for controlling a vehicle and is connected to each of the plurality of in-vehicle ECUs;
   a second processing unit that is connected to each of the plurality of in-vehicle ECUs and is configured to communicate with the first processing unit, wherein the second processing unit is a physically and functionally distinct unit relative to the first processing unit;

a first reception table including information indicating a type of a reception target message of the first processing unit, which is a message, among the messages transmitted by the plurality of in-vehicle ECUs, that is to be received by the first processing unit; and a second reception table different than the first reception table and including information indicating a type of a reception target message of the second processing unit, which is a message, among the messages transmitted by the plurality of in-vehicle ECUs, that is to be received by the second processing unit, wherein the second processing unit receives the reception target message of the second processing unit based on the second reception table, and outputs information included in the received reception target message to the first processing unit, and the first processing unit receives the reception target message of the first processing unit based on the first reception table, and performs the control processing based on at least one of information included in the received reception target message and information included in the reception target message output from the second processing unit; and wherein the first reception table includes information indicating the type of the reception target message of the second processing unit, the second reception table includes information indicating the type of the reception target message of the first processing unit;

the first processing unit receives the reception target message of the first processing unit and the reception target message of the second processing unit based on the first reception table in response to a request from the second processing unit, and performs the control processing based on information included in the received message, and the second processing unit receives the reception target message of the first processing unit and the reception target message of the second processing unit based on the second reception table in response to a request from the first processing unit, and performs the control processing based on information included in the received message; and wherein each message output by each in-vehicle ECU is input to the first processing unit and the second processing unit, the first processing unit and the second processing unit check an input status of the message in the first processing unit and the second processing unit through communication, and one of the first processing unit and the second processing unit detects an abnormality in a portion of wiring connecting the one of the first processing unit and the second processing unit and the in-vehicle ECU, and if the abnormality is detected, requests the other of the first processing unit and the second processing unit to receive the reception target message of the first processing unit and the reception target message of the second processing unit.

2. The in-vehicle apparatus according to claim 1, wherein the second processing unit compresses information included in the received reception target message and outputs the compressed information to the first processing unit.

3. The in-vehicle apparatus according to claim 1, wherein the second processing unit acquires a plurality of pieces of information included in the received reception target message, and collectively outputs the acquired plurality of pieces of information included in the reception target message to the first processing unit.

4. The in-vehicle apparatus according to claim 1, wherein the reception target message of the first processing unit includes a message, among the messages transmitted by the plurality of in-vehicle ECUs, that is output in response to an event.

5. The in-vehicle apparatus according to claim 1, wherein the messages output by the plurality of in-vehicle ECUs include messages regarding a driving support system, the reception target message of the first processing unit includes a message including inter-vehicle data or driving force data among the messages regarding the driving support system, and the reception target message of the second processing unit includes a message including meter notification data among the messages regarding the driving support system.

6. The in-vehicle apparatus according to claim 1, wherein the first processing unit transmits a message including a processing result of the control processing to the in-vehicle ECU directly, or transmits a message including a processing result of the control processing to the in-vehicle ECU via the second processing unit, depending on the type of the message.

7. An information processing method in which an in-vehicle device performs information processing based on messages output by a plurality of in-vehicle ECUs, the in-vehicle device including a first processing unit that is configured to perform processing for controlling the plurality of in-vehicle ECUs and is connected to each of the plurality of in-vehicle ECUs, and a second processing unit that is connected to each of the plurality of in-vehicle ECUs and is configured to communicate with the first processing unit, wherein the second processing unit receives a reception target message of the second processing unit, which is a message, among the messages transmitted by the plurality of in-vehicle ECUs, that is to be received by the second processing unit, based on a second reception table including information indicating a type of the reception target message of the second processing unit, the second table specifies a first set of messages, among the messages transmitted by the plurality of in-vehicle ECUs, to be received by the second processing unit and outputs information included in the received message to the first processing unit, and the first processing unit receives a reception target message of the first processing unit, which is a message, among the messages, that is to be received by the second processing unit, based on a first reception table that specifies a second set of messages, among the messages transmitted by the plurality of in-vehicle ECUs, to be received exclusively by the first processing unit, wherein the first set and the second set are not identical and at least one message is assigned to only one of the first or second processing units, the first reception table including information indicating a type of the reception target message of the first processing unit, and performs control processing for controlling a vehicle based on at least one of information included in the received target message and information included in the message output from the second processing unit; and wherein the first reception table includes information indicating the type of the reception target message of the second processing unit, the second reception table includes information indicating the type of the reception target message of the first processing unit;

the first processing unit receives the reception target message of the first processing unit and the reception target message of the second processing unit based on the first reception table in response to a request from the second processing unit, and performs the control processing based on information included in the received message, and the second processing unit receives the reception target message of the first processing unit and the reception target message of the second processing unit based on the second reception table in response to a request from the first processing unit, and performs the control processing based on information included in the received message; and wherein each message output by each in-vehicle ECU is input to the first processing unit and the second processing unit, the first processing unit and the second processing unit check an input status of the message in the first processing unit and the second processing unit through communication, and one of the first processing unit and the second processing unit detects an abnormality in a portion of wiring connecting the one of the first processing unit and the second processing unit and the in-vehicle ECU, and if the abnormality is detected, requests the other of the first processing unit and the second processing unit to receive the reception target message of the first processing unit and the reception target message of the second processing unit.

* * * * *